United States Patent [19]

Yanagawa

[11] 3,785,732
[45] Jan. 15, 1974

[54] MICROREADER

[75] Inventor: Nobuyuki Yanagawa, Oimachi Yamada, Japan

[73] Assignee: Ricoh Co. Ltd., Tokyo, Japan

[22] Filed: Nov. 15, 1972

[21] Appl. No.: 306,563

[30]  Foreign Application Priority Data
Nov. 15, 1971  Japan.............................. 46/90657
Nov. 17, 1971  Japan.............................. 46/91455
Nov. 29, 1971  Japan.............................. 46/111058

[52] U.S. Cl. .................................. 355/45, 355/66
[51] Int. Cl. .......................................... G03b 27/70
[58] Field of Search ................... 355/40, 43, 44, 45, 355/46, 53, 54, 65, 66

[56]  References Cited
UNITED STATES PATENTS

| | | | |
|---|---|---|---|
| 2,940,358 | 6/1960 | Rosenthal ............................ | 355/66 |
| 3,267,797 | 8/1966 | Fowlie et al. ........................ | 355/65 |
| 3,697,176 | 10/1972 | Kuehnle .............................. | 355/45 |
| 3,703,334 | 11/1972 | Knechtel et al ................... | 355/66 X |
| 3,709,603 | 1/1973 | Furuichi ............................. | 355/66 X |
| 3,713,737 | 1/1973 | Suzuki et al ........................ | 355/45 |

Primary Examiner—Samuel S. Matthews
Assistant Examiner—Richard A. Wintercorn
Attorney—Henry T. Burke et al.

[57]  ABSTRACT

A microreader composed of a number of self-contained sections which may be assembled together in desired configurations and which sections include a projection unit containing means for automatically selecting and projecting desired information from one or a number of information cards; a screen unit for displaying the projected information; a reflector unit for appropriately transferring the projected information from the projector unit to the screen unit; and, if desired, a printer unit for reproducing the projected information. The screen unit has a surface for visually displaying the projected information and a surface for passing the projected information to the printer unit for copying and contains means for permitting the transfer of the projected information between them. The automatic information selecting system is described in detail.

12 Claims, 27 Drawing Figures

MICROREADER

BACKGROUND OF THE INVENTION

This invention relates to a microreader and a microreaderprinter provided with an information card retrieval apparatus.

Microreaders have hitherto been in use for reading microfilms or information cards containing miniaturized information such as, for example, as microfiches. The microreaders of the prior art in reading information cards containing a large number of items of information in frames, as on microfiches, require means for adjusting the position of an information card to set a desired frame of such information at a predetermined position for projecting an image of the frame on to a screen by an optical system which is fixed against movement. In conventional microreaders of the character described, the area required for the information card to move in the machine amounts to four times as large as the area occupied by the information card itself, thereby making it impossible to obtain an overall compact size in a microreader.

In addition, the provision in a conventional microreader of an information card retrieval apparatus for selecting and withdrawing a desired information card from a large number of information cards stored in a container has had the disadvantage of increasing the size of the microreader and rendering the construction complex.

Further, no microreader of the prior art had had a printing device attached thereto. This had made it necessary to entrust someone specializing in microfiche film duplication with the task of producing a duplicate or duplicates of a desired frame or frames of a microfiche.

The present invention obviates the aforementioned disadvantages of the prior art, and accordingly provides a microreader which is compact in size, simple in construction and low in cost and can detachably mount a printer unit thereon. The present invention also provides a novel projection optical apparatus which makes it possible to reduce the area in which the information card and/or the projection optical apparatus move for setting the desired frame of a microfiche film at the projection position whereby a compact and simple microreader can be constructed.

Still another feature of the invention is the provision of an information card retrieval apparatus and a novel code read-out or scanning device which are adapted for use with a microreader of the compact type.

A further feature of the present invention is the provision of a microreader which permits the desired information to be read out either by identifying and withdrawing a desired information card from a container containing a large number of information cards therein or by manually inserting a single desired information card in the microreader.

SUMMARY OF THE INVENTION

The present invention involves a microreader comprising a projection unit, a mirror unit, a screen unit and a printer unit which are all detachably mounted in the microreader.

The projection unit according to this invention embodies an information card retrieval apparatus comprising a scanning device for selecting cards, a card withdrawal device for withdrawing the desired card from the container, and a projection optical apparatus which permits the desired information to be read out either by searching for and withdrawing a desired information card from a container containing a large number of information cards therein or by manually inserting a single desired information card in the microreader.

This projection unit permits the reduction of the area required for a desired information card to be moved in the machine to set a desired frame thereof at the projection position and thus minimizes unoccupied space in the machine by providing that the selected information card or the singly inserted information card be moved in one direction only for placing said information card at the card read-out position, and that the projection optical apparatus be moved in a direction normal to the direction of movement of the card for placing the desired frame of the selected information card at the frame read-out position.

The mirror unit, according to the invention, embodies a plurality of reflectors that are moved a distance which is in a pre-determined proportion to the distance covered by the projection optical apparatus when the projection optical apparatus moves, so that the length of the path of light from the mirror unit optical path length can be kept constant with respect to all the frames of an information card.

Further, in accordance with the invention, the path of light from the mirror unit can be varied by pivotally moving a reflector of the screen unit whereby the microreader can be switched between read-out of the desired information by projecting an image of the same onto the screen and printing of the desired information by means of the printer unit.

The microreader is capable of selectively mounting a plurality of units therein and can be converted into a micro-reader-printer by merely placing a printer unit on the machine. It can be used without printer if so desired, so that the machine can meet the demand of a wide variety of users. Particularly, the provision of means for switching the machine between read-out of the desired information by projecting an image of the same on the screen and printing of the desired information by means of the printer increases the range of use of the machine.

According to the invention, there is provided an information card retrieval apparatus in which a sensor is used as means for selecting a desired information card by scanning the cards, such sensor being adapted to reciprocate and thereby simplifying the operation for searching for a desired information card. The desired information card and the projection optical apparatus are moved respectively in one direction normal to each other for setting the information card at the projection position, thereby simplifying the mechanism for controlling the positions of the card and the projection optical apparatus and reducing the area required for the movement thereof. Control of intermittent movements of the desired information card and/or the projection optical apparatus is effected by a movement control device in the form of a one complete revolution or one-half revolution clutch device using a cam or a pawl and ratchet arrangement, so that control of the intermittent movements can be accomplished by energization of a solenoid or solenoids. This permits the construction of the machine to be simplified, maintenance of the machine to be facilitated and control of the intermittent movements to be effected positively.

Other and additional features and advantages of the invention will become evident from the description set forth hereinafter when considered in conjunction with the accompanying drawings.

DETAILED DESCRIPTION OF THE INVENTION

Figure 1:
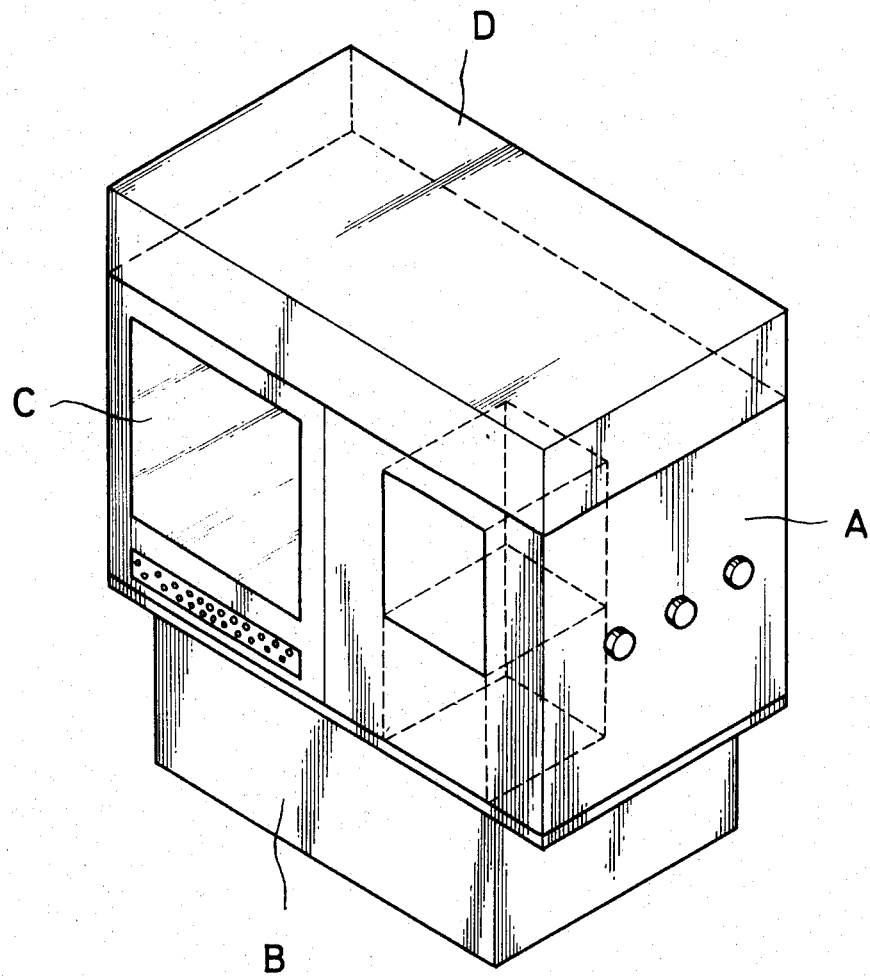
FIG. 1 is a perspective view of the microreader-printer provided with an information card retrieval apparatus according to this invention.

In FIG. 1, a microreader according to this invention is shown to comprise a projection unit A comprising an information card retrieval apparatus and a projection optical apparatus, a mirror unit B into which the projected light passes and which constitutes the platform on which other units are installed, a screen unit C on which an image of information is formed, and a printer unit D used for printing an image of information. All the units are individually detachable and can be assembled to provide a microreader-printer. In effecting maintenance and repair, the unit in question has only to be detached from the other units, thereby facilitating handling of the microreader. Since all the units are compact, it is possible to assemble them into a compact microreader-printer which is convenient to carry around. The printer unit D can be done without when no copying is required.

Figure 2:
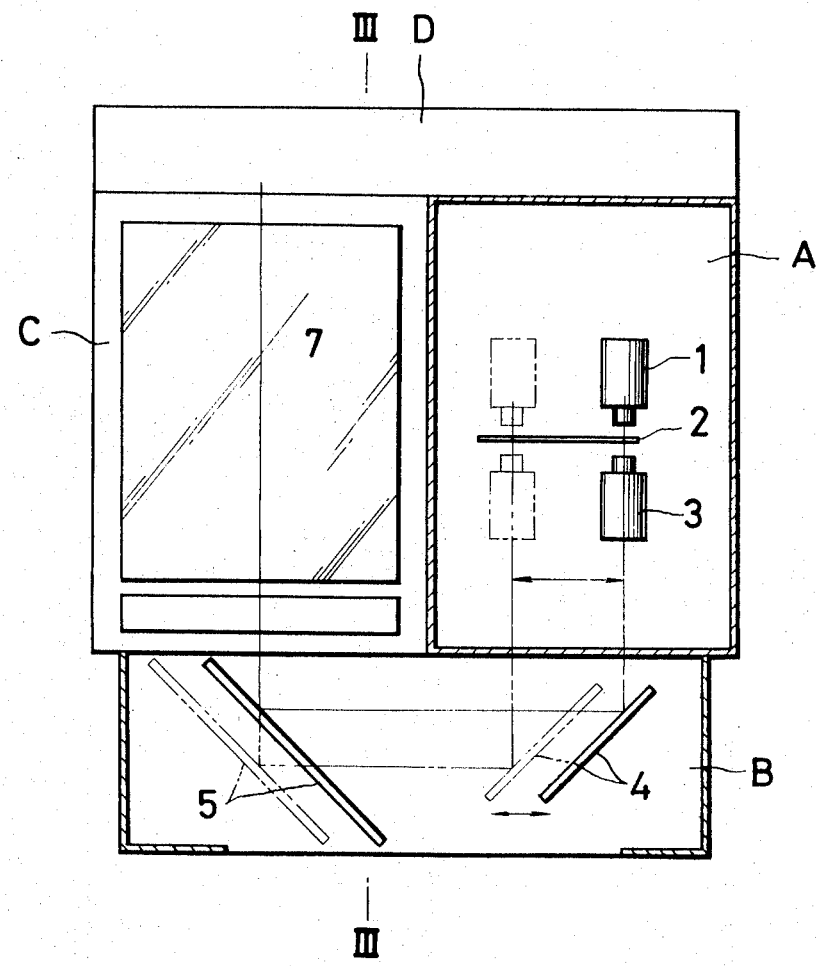
FIG. 2 is a fragmentary sectional front view of the micro-reader-printer shown in FIG. 1.
Figure 3:
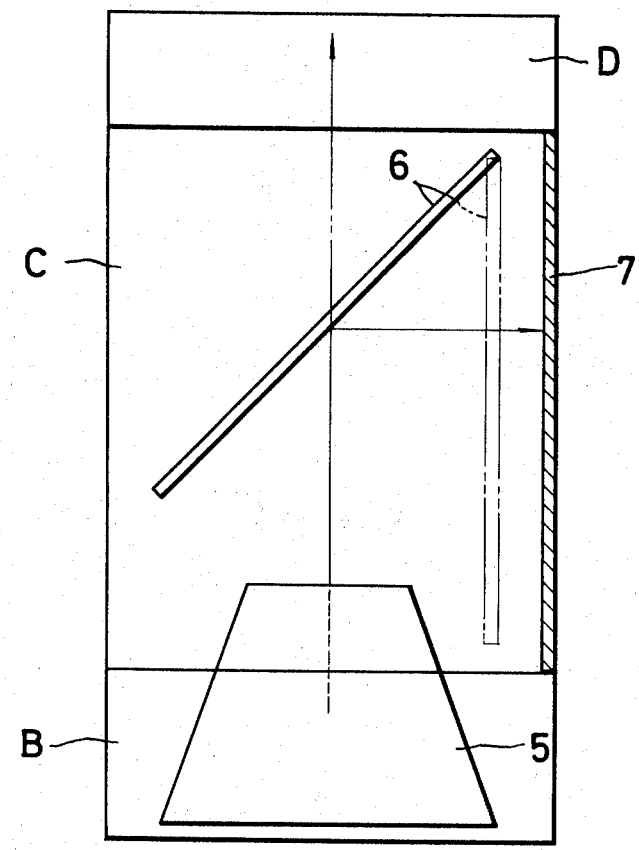
FIG. 3 is a sectional view taken along the line III—III of FIG. 2.

In FIG. 2 and FIG. 3, the microreader is shown in greater detail, wherein light emanating from a projection lamp device 1, including a light source, a reflector and a plurality of lenses, is transmitted through an information card 2, passes through a projection device 3, including a rotary prism and a plurality of lenses, and is successively reflected by a first mirror 4 and a second mirror 5 of the mirror unit B and a third mirror 6 of the screen unit C, so that an image of the information card can be formed on a screen 7. When it is desired to produce a duplicate of the image of the information on card 2 by printing, the third mirror 6 is pivoted to the dash-and-dot line position shown in FIG. 3. This results in the light reflected by the mirror 5 being incident on a photosensitive sheet of the printer unit D so as to form an image of the information card 2 thereon.

The projection lamp device 1 and projection device 3 are moved by an instruction signal to a position in which a picture of a frame of the information card 2 is projected. When this is the case, the mirrors 4 and 5 simultaneously move a distance corresponding to one-half the distance covered by the movement of the projection device so as to keep the optical path length from the projection lamp device constant at all times.

Figure 4:
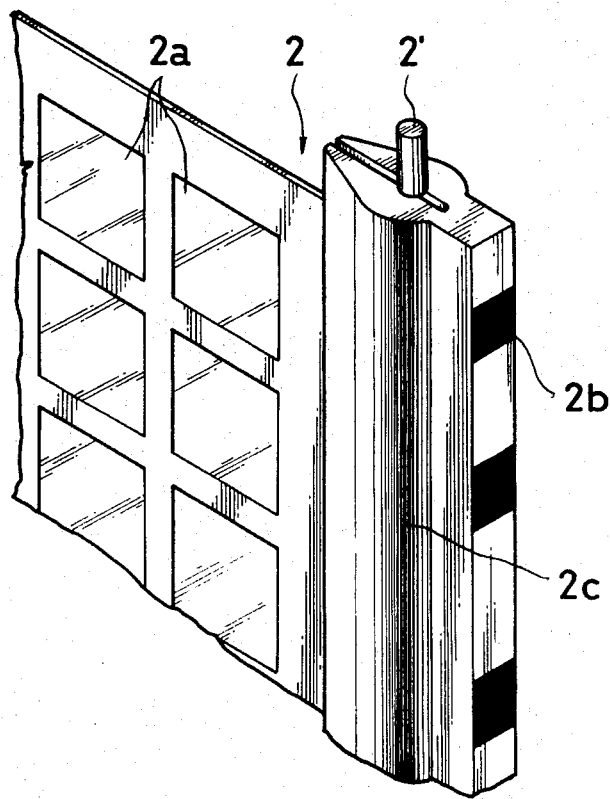
FIG. 4 is a fragmentary perspective view of an information card.

The information card 2 used for reading out information may be a microfiche, aperture card or the like which can be stored in a container. One example of such information card 2 is shown in FIG. 4 in which a large number of items of information are arranged in frames 2a disposed in lengthwise columns and transverse rows in predetermined numbers. The information card 2 is shown as having a clip 2c on which bits of a coded mark 2b for identification can be printed with a reflective paint or otherwise superposed in a plurality of positions.

Figure 5:
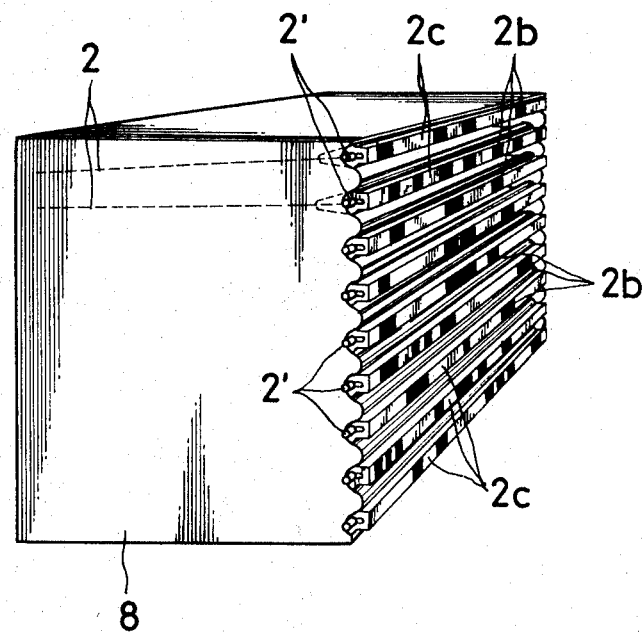
FIG. 5 is a perspective view of the information card container.
Figure 6:
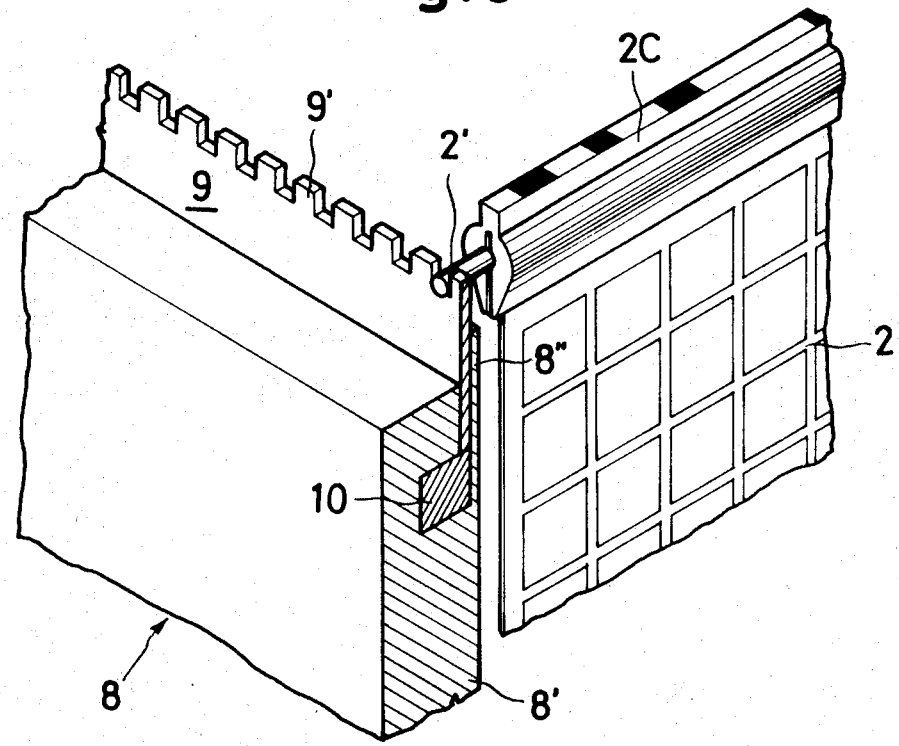
FIG. 6 shows an information card in relation to the information card container.
Figure 7A:
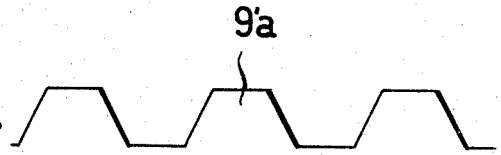
FIGS. 7a — 7e show various forms of rack-shaped cutouts of the information card support portion of the information card container; indicia
Figure 7B:
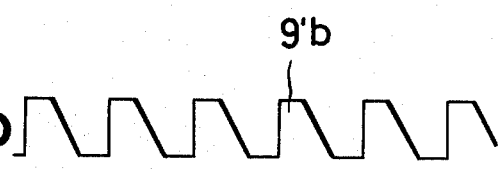
Figure 7C:
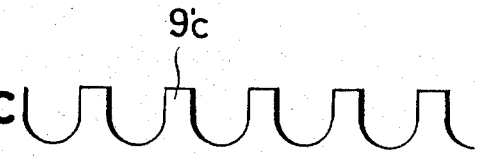
Figure 7D:
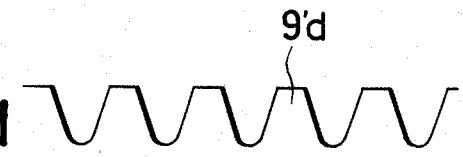
Figure 7E:
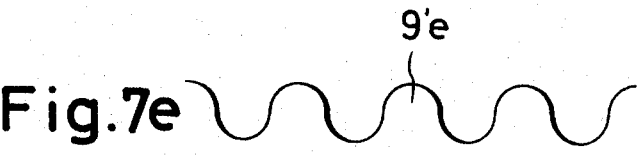

A plurality of information cards 2 each provided with a predetermined coded mark are contained in a container 8 for easy insertion and withdrawal as shown in FIG. 5 and FIG. 6. Each information card 2 has its pins 2' positioned in cutouts formed in rack-shaped support portions 9 on opposite side edges of the container 8 and held in position by the magnetic force of a permanent magnet or magnets 10. The information cards held in this way are spaced equidistantly from one another in accordance with the pitch of the cutouts.

As shown in FIG. 6, each of the non-magnetic rack-shaped support portions 9 is held between a side wall 8' of the container 8 and an iron plate yoke 8'' secured to the side wal 8', and the permanent magnet 10 is embedded in the side wall 8' to extend throughout the entire length of the support portion 9 or a plurality of permanent magnets 10 arranged equidistantly from one another are embedded therein. The iron plate yoke 8'' is magnetically excited as it is maintained in contact with the permanent magnet or magnets 10.

The permanent magnet or magnets 10 have magnetic force such that the information card 2 is not dislodged from its position in the cutouts by slight mechanical vibrations but can readily be withdrawn mechanically. A variety of shapes of cutouts may be used for the rack-shaped portions 9' as shown in FIGS. 7a-7e.

It is to be understood that the invention is not limited to the aforementioned manner of holding the information cards 2 and that any form of holding the cards in a container for ready insertion and withdrawal may be used.

Figure 8:
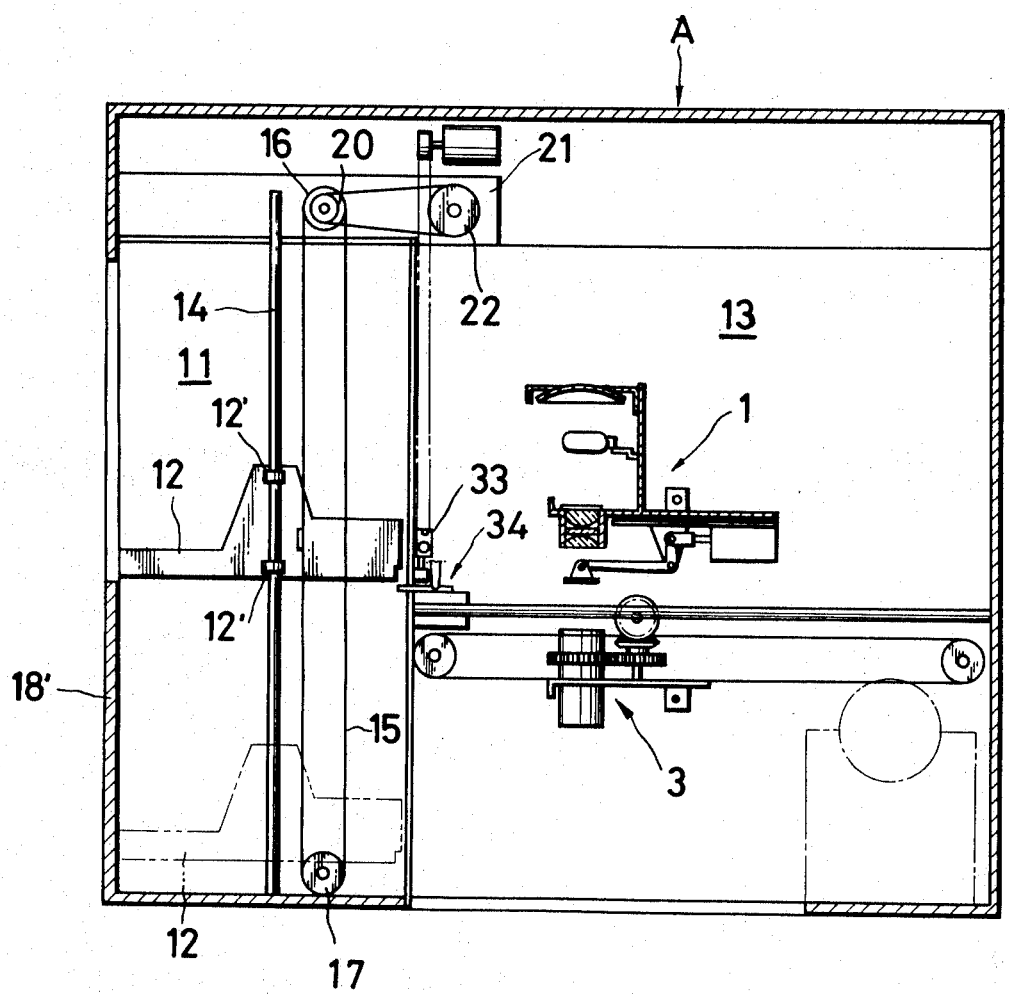
FIG. 8 is a sectional side view of the projection unit.
Figure 9:
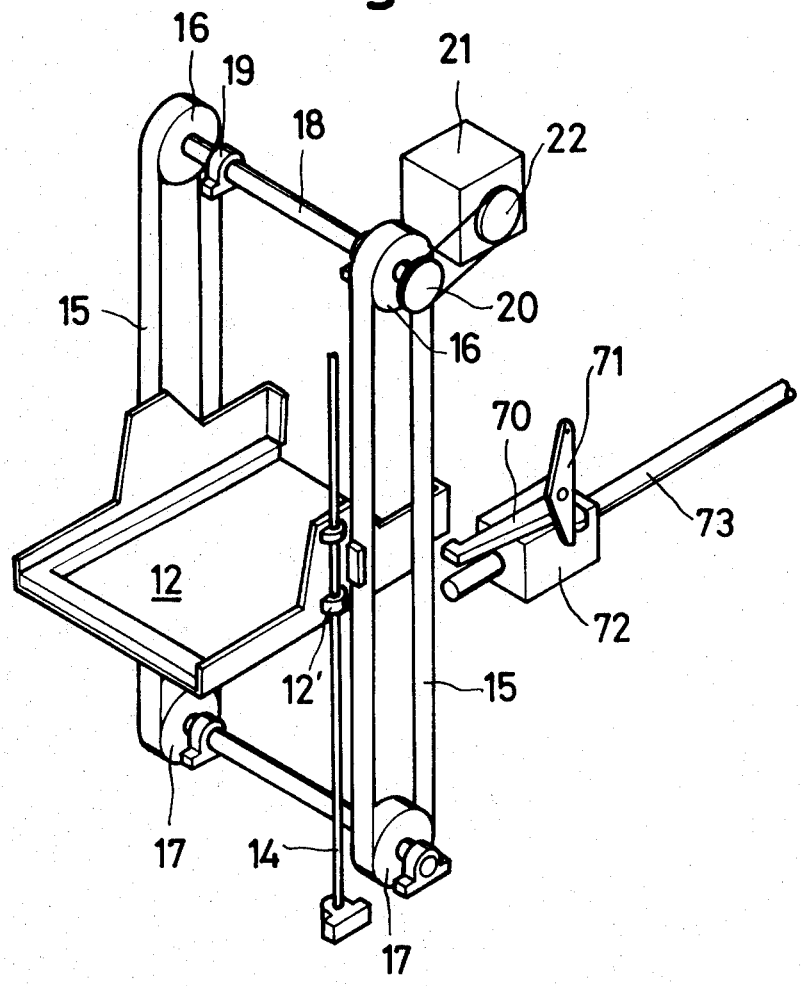
FIG. 9 is a perspective view of the information card container support panel control device.

The information card container 8 containing therein a number of information cards 2 in the manner shown in FIG. 5 is placed on a container support panel 12 (FIG. 10) in a container chamber 11 of the projection unit as shown in FIG. 8 and 9 for performing a card scanning operation to find a desired information card. The projection unit A comprises a projection chamber 13 in addition to the container chamber 11 in which the container support panel 12 reciprocates vertically to move the information card container upwardly and downwardly.

In FIG. 8 and FIG. 9, the container support panel 12 is shown as having a plurality of lugs 12' projecting from opposite sides thereof through which extend a plurality of guide rods 14 for guiding the container support panel 12 in its vertical reciprocating motion. The container support panel 12 is adapted to reciprocate between an uppermost or stand-by position shown in solid lines and a lowermost position shown in dash-and-dot lines in FIG. 8.

Figure 10:
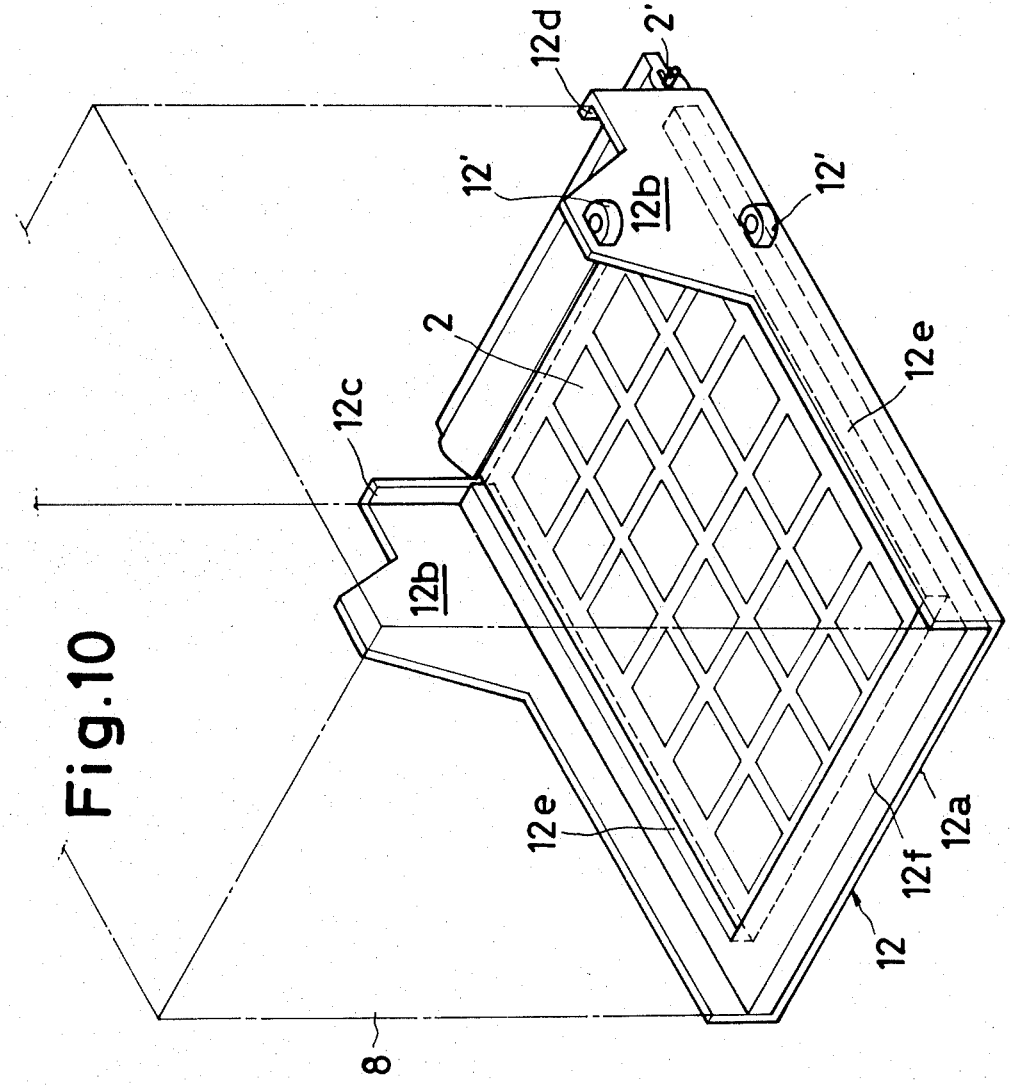
FIG. 10 is a perspective view of the information card container support panel.

In FIG. 10, the container support panel 12 is shown as including a bottom plate 12a, opposite side walls 12b, and positioning forward wall portions 12c and 12d, with container support bases 12e being formed in marginal portions connecting the bottom plate 12a with the opposite side walls 12b. Likewise, a container support base 12f is formed at the rear end marginal portion of the bottom plate 12a. The container support bases 12e and 12f constituting a U-shaped container support means defining a U-shaped space of an area large enough to hold therein a single information card 2 for ready insertion and withdrawal. The positioning forward wall portions 12c and 12d define therebetween a space large enough for moving an information card 2 therethrough.

When the information card container 8 is not disposed on the container support panel 12, a single information card 2 can be slipped into the U-shaped space surrounded by the U-shaped container support bed on the bottom plate 12a.

The lugs 12' for the guide rods 14 to extend therethrough for guiding the container support panel 12 when the position of the container is changed as in the scanning operation are shown in FIG. 9 as projecting from the side wall 12b. The container support bases 12e and 12f have a height such that, when the container 8 is placed on them and the container support panel 12 is disposed in the stand-by position, the lowermost card in the information card container 8 is disposed in a read-out position at which the sensor is disposed. The height of the container support bases 12e and 12f is related to the plane of the bottom plate 12a such that, when a single information card 2 is inserted in the U-shaped space surrounded by the container support bases 12e and 12f on the bottom plate 12a, the pins 2' of the card are disposed in a position in which they are gripped by a pair of grippers 70 of the card withdrawal device. The dimensions of information card container 8 and the container support panel 12 are set such that, when the information card container 8 shown in FIG. 5 is placed on the container support panel 12, the rack 9' of the container 2 extends forwardly of the positioning forward wall portions 12c and 12d on the container support panel 12.

Transmission means 15, e.g. chains, timing belts or the like, is secured at one portion thereof to the opposite sides of the container support panel 12 as shown in FIG. 9. The transmission means 15 is trained about upper transmission wheel 16 and lower transmission wheels 17 which may be chain wheels, pulleys, or the like. The lower transmission wheels 17 are rotatably supported through known bearing means by a casing 18' of the projection unit A through known means. The upper transmission wheels 16 are secured for rotation in unison to a shaft 18 rotatably journalled in bearings 19 and having a drive wheel 20 secured thereto. The drive wheel 20 is drivingly connected to a drive wheel 22 of an information card contianer movement control clutch device 21 through a chain, timing belt of the like.

Figure 11:
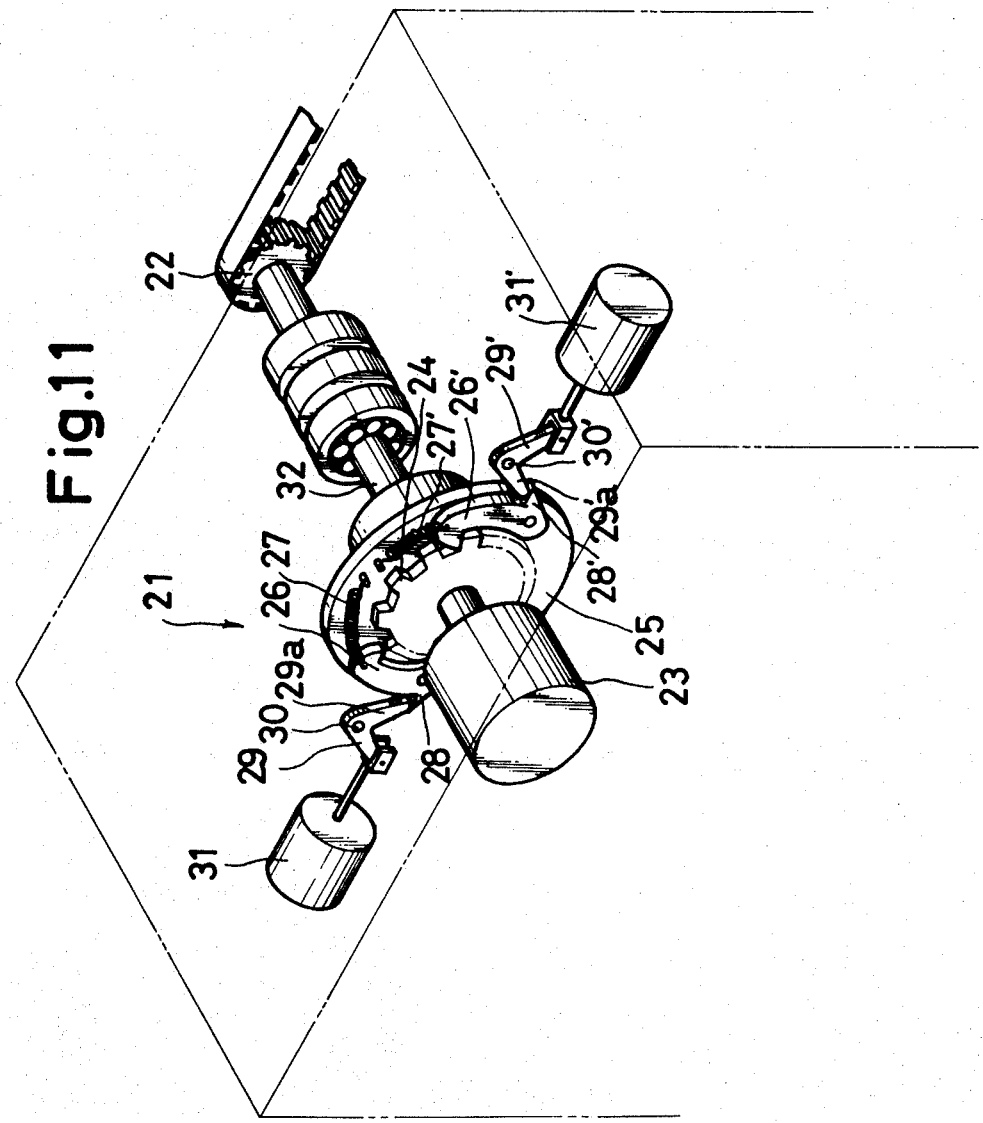
FIG. 11 is a perspective view of the information card container movement control clutch device.

As shown in FIG. 11, the information card container movement control clutch device 21 comprises a ratchet wheel 24, mounted on a shaft of a reversible electric motor 23, and a rotary disk 25. The rotary disk 25 pivotally supports a pair of pawls 26 and 26' which are disposed opposite to each other with respect to the ratchet wheel 24 and urged by springs 27 and 27' respectively to be brought into engagement with teeth of the ratchet wheel 24.

The pawls 26 and 26' have at opposite ends thereof, bent end portions 28 and 28', respectively, which are engaged by control end portions 29a and 29'a of control levers 29 and 29', respectively. The control levers 29 and 29' which are pivotally supported by pins 20 and 20' respectively, have opposite ends which are pivotally connected to plungers of solenoids 31 and 31', respectively. The rotary disk 25 is supported on one end of a shaft 32, whose other end supports the drive wheel 22 of the information card container movement control clutch device 21.

In operation, the motor 23 may be rotated clockwise, as viewed from the near face of the ratchet wheel, upon receipt of an appropriate signal. The solenoid 31 may be energized upon receipt of the same or another signal, to push its plunger outwardly to pivot the control lever 29 and thereby release the control end portion 29a from engagement with the bent end portion 28 of the pawl 26. When this is the case, the pawl 26 is caused to press against the ratchet wheel 24 by the biasing force of the spring 27 into engagement with a tooth of the ratchet wheel 24, thereby rotating the rotary disk 25.

The solenoid 31 is de-energized soon after it is energized, so that the bent end portion 28 of the pawl 26 is brought into engagement with the control end portion 29a of the control lever 29 again when the rotary disk 25 makes one complete revolution, thereby releasing the pawl 26 from engagement with tooth of the ratchet wheel 24 and stopping the rotary disk 25.

When the rotary disk 25 makes one complete revolution, the drive wheels 22 and 20 are rotated a predetermined amount. This may be accomplished through known speed reducing means, if desired. The drive wheel 20 drives the transmission means 15 through the transmission wheels 16 to move the container support panel 12 downwardly a predetermined distance. The distance convered by the downward movement of the transmission means 15 caused by one complete revolution of the rotary disk 25 of the clutch device 21 corresponds to the spacing between adjacent information cards 2 in the information card container 8. Thus, the information card container can be moved downwardly step by step when searching for a desired information card.

When it is desired to return the information card container to its stand-by position after the desired information card is found, the motor 23 is rotated in the reverse direction and the solenoid 31' is energized by appropriate signals. This releases the control end portion 29'a of the control lever 29' from engagement with bent end portion 28' of the pawl 26' and brings the pawl 26' into engagement with a tooth of the ratchet wheel 24. Thus, the rotary disk 25 is rotated in a direction opposite to the direction of rotation described with reference to the operation of moving the information card container downwardly.

When the container support panel 12 reaches its stand-by position, the solenoid 31 is de-energized, such as by the actuation of a microswitch, and the control end portion 29'a of the control lever 29' is brought into engagement with the bend end portion 28' of the pawl 26', thereby stopping the rotary disk 25. The control lever 29' is held in a position in which its control end portion 29'a is maintained out of engagement with the pawl 26' till the microswitch is actuated, such as by being pressed by the container support panel 12 when it is brought to its stand-by position.

As shown in FIG. 8, a scanning device 33 and a card withdrawal device 34 which constitute the card retrieval apparatus are disposed in an information card read-out or scanning position. The read-out position is set such that is corresponds to the position of the first information card in the information card container disposed in its stand-by position.

Figure 12:
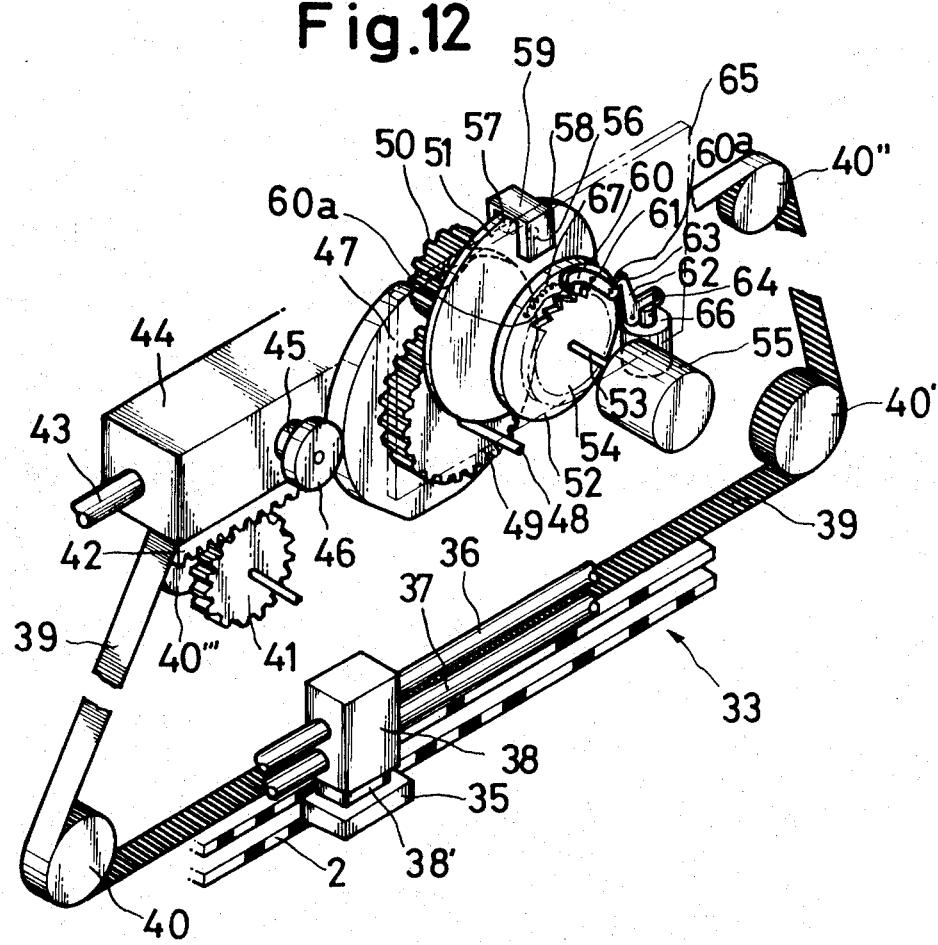
FIG. 12 is a perspective view of the card read-out or scanning device.

In FIG. 12, the sensor 35 of the scanning device 33 is shown disposed in a position in which it is juxtaposed to the mark bearing edge of information card 2 disposed in the read-out position. The sensor 35 is carried through a bracket 38' by a slider 38 guided in sliding motion by guide rods 36 and 37 secured to the casing 18'. The slider 38 is secured to a portion of transmission means 38, e.g. a timing belt, chain wire or the like, and caused to reciprocate as the transmission means 39 is operated.

The transmission means 39 is entrained about transmission wheels 40, 40', 40'' and 40''' which are rotatably supported by a scanning device frame through known means. A pinion 41 is attached to a shaft supporting the transmission wheel 40''', so that the pinion 41 and the transmission wheel 40''' rotate as a unit. The pinion 41 is maintained in meshing engagement with a rack 42 secured to a slider 44 guided in sliding motion by a guide rod 43 secured to the casing 18'. The slider 44 has a pin 45 projecting therefrom which rotatably supports a cam follower roller 46 utilizing a bearing, for example, and maintained in engagement with the periphery of a heart-shaped cam 47.

The heart-shaped cam 47 is supported by a shaft 48 having secured thereto a gear 49 which is maintained in meshing engagement with another gear 50. The shaft 48 is rotatably supported by the scanning device frame while the gear 50 is supported by a shaft 53 together with a timing disk 51 and a rotary disk 52 but prevented from rotation relative thereto. A ratchet wheel 54 is rotatably mounted on the shaft 53 in a position in which it is adjacent the rotary disk 52 and connected to a motor 55.

The timing disk 51 may be formed therein with one opening, two openings or four openings as desired. In the embodiment shown and described, one opening 56 is formed therein.

A light emitter or a lamp 57, for example, and a light receiver or a phototransistor 58, for example, are supported by a bracket 59 and disposed in positions in which the light emanating from the lamp 57 is incident on the phototransistor 58 through the opening 56 in the timing disk 51. The rotary disk 52 pivotally supports through a pin 61 one end of a pawl 60 which is formed at the other end thereof with a stop 60a adapted to be engaged by a control end portion 63 of a control lever 62 pivotally supported through a pin 64 by a frame 65. The control lever 62 is pivotally connected to a plunger of a solenoid 66 secured to the frame 65.

When a signal to search for an information card is produced, the motor 55 is actuated to rotate in a predetermined direction during the scanning operation. When the solenoid 66 is energized upon receipt of the signal to bring the control end portion 63 of the control lever 62 out of engagement with the stop 60a of the pawl 60, the pawl 60 is urged by the biasing force of a spring 67 to press against the ratchet wheel 54. This brings the pawl 60 into engagement with a tooth of the ratchet wheel 54, thereby causing the rotary disk 52 supporting the pawl 60 to rotate with the ratchet wheel 54.

The solenoid 66 remains energized for a short time interval and is then de-energized. When the pawl 60 makes one complete revolution together with the rotary disk 52, the stop 60a is again brought into engagement with the control end portion 63 of the control lever 62 and the pawl 60 is released from engagement with the ratchet wheel 54, thereby stopping the rotary disk 52.

The timing disk 51 also makes one complete revolution together with the rotary disk 52 when the latter makes one complete revolution. When the opening 56 is brought into index with the path of light emanating from the lamp 57 while the timing disk 51 is rotating, the light is incident on the phototransistor 58 to actuate the same. Actuation of the phototransistor 58 is transmitted to the sensor 35 as a command signal to perform read-out, thereby commencing an information card scanning operation. The sensor 35 may comprise a light emitter, such as a light emitting diode, and a light receiver, such as a phototransistor, built therein as a unit, so that the coded marks scanned by the sensor can be distinguished from one another depending on the intensity of the light reflected by the marks.

Rotation of the rotary disk 52 and the timing disk 51 causes through the gears 50 and 49, the cam 47 to rotate step by step through a predetermined angle. Angular rotation of the cam 47 through the predetermined angle causes, through the cam follower roller 46, the slider 44 and the rack 42 to move a predetermined distance. Movement of the rack 42 is transmitted, through rotation of the pinion 41 and the transmission wheel 40''', to the transmission means 39 to move the same distance corresponding to one bit of the mark. Since the bracket 38' is secured to the transmission means 39, the sensor 35 is moved a distance corresponding to one bit of the mark when the rotary disk 52 makes one complete revolution. Thus, the sensor 35 scans the mark on the information card 2, bit by bit as a signal is produced through the opening 56 in the timing disk 51.

If the rotary disk 52 makes revolutions corresponding in number to the number of the bits of the coded marks 2b to be scanned, or 16 revolutions in the case of marks comprising 16 bits, then the heart-shaped cam 47 makes one-half revolution. The sensor 35 moves from the position of the first bit of the coded marks to the position of the last bit thereof on the information card to read out the marks as the heart-shaped cam 47 makes one-half revolution. When the next following information card is placed at the read-out position following completion of read-out of the last bit of the preceding information card, the sensor 35 moves from the position of the last bit of the marks on this card to the position of the first bit thereon to read out the marks as the heart-shaped cam 47 makes the other one-half revolution. Thus, it is necessary to set the shape and configuration of the cam such that the sensor 35 performs two consecutive read-out operations at the first bit position and the last bit position.

The coded marks of each information card are read out by the scanning device 35 comprising the elements 35 to 67. When the card having marks corresponding to the signal is found, the particular card is withdrawn from the information card container 8 by the card withdrawal device 34.

Figure 13:
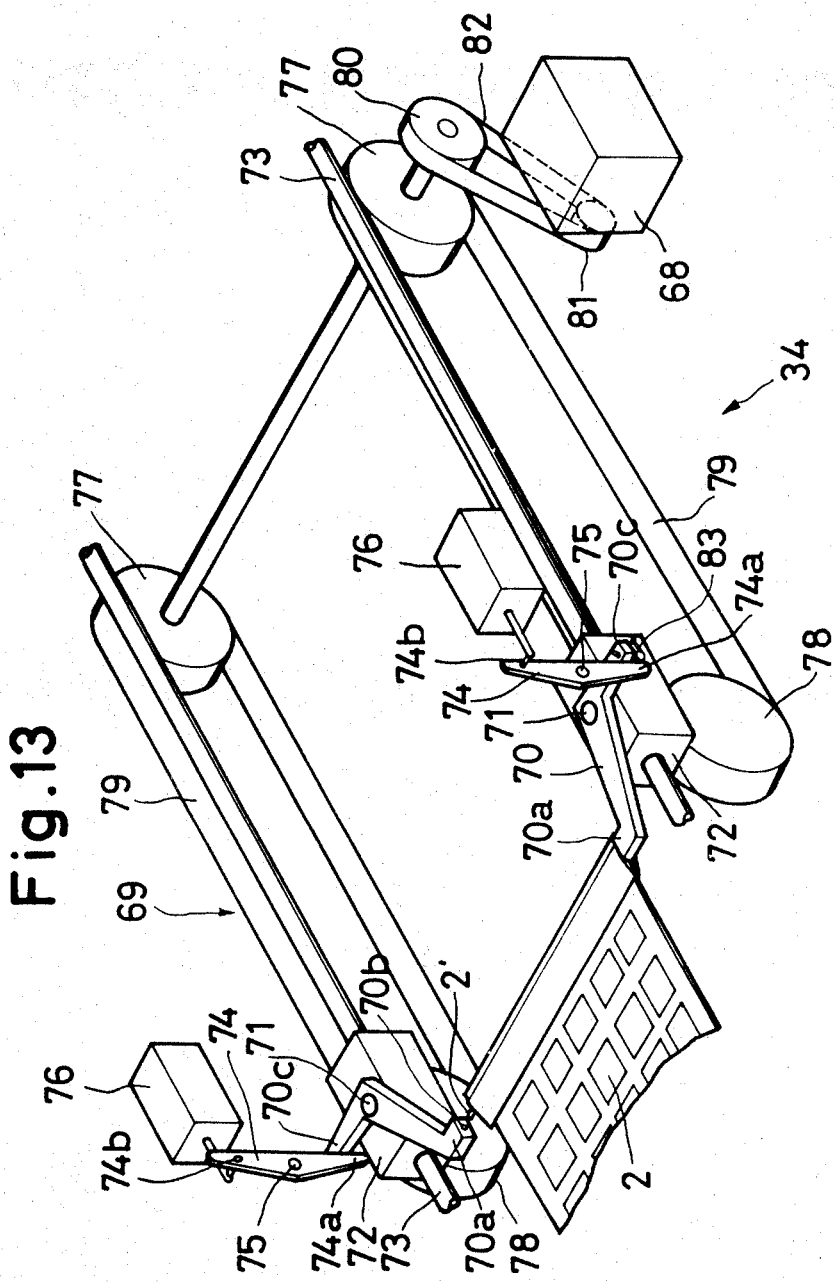
FIG. 13 is a schematic perspective view of the card withdrawal device.

In FIG. 13, the card withdrawal device is shown as comprising a movement control clutch device 68 and a moving device 69. The moving device 69 comprises a pair of sliders 72 slidably supporting through a plurality of pins 71 a pair of grippers 70 each formed at one end 70a thereof with an opening 70b for receiving one of the pins 2' of an information card 2 to grip the card. The pair of sliders 72 are guided in sliding motion by guide rods 73 secured to the frame 18'. The grippers 70 are each formed at the other end 70c thereof with an engaging portion adapted to be brought into engagement with one of control levers 74 at one end 74a thereof.

The control levers 74 are each supported for pivotal movement by a pin 75. Each of the control levers 74 is pivotally connected at the other end 74b thereof to a rod of a solenoid 76.

The pair of sliders 72 are each secured to one portion of transmission means 79, e.g. a chain, timing belt or the like, which is entrained about transmission wheels 77 and 78 which may be chain wheels, pulleys or the like, so that the sliders 72 reciprocate as the transmission means 79 is operated. The transmission wheels 77 and 78 are rotatably supported by known means. The transmission wheels 77 are connected to movement control means 68 through transmission means 32 entrained about transmission wheels 80 and 81.

In the aforementioned construction, one gripper and moving means making up a set are arranged in a position corresponding to that of one of the pins 2' of the information card while the other gripper and other moving means making up a set are arranged in a position corresponding to that of the other pin 2', so that the grippers can grip the two pins 2' projecting from opposite sides of the information card 2. The transmission wheels 77 disposed on opposite sides are interconnected such that they rotate conjointly.

If the solenoids 76 are energized upon receipt of a card withdrawal signal, then the control levers 74 are pivoted about the respective pins 75 and their end portions 74a are released from engagement with the engaging portions 74c of the grippers 70, thereby permitting the grippers 70 to be pivoted about the pins 71 by the biasing force of resilient means, such as springs 83, so that the openings 70b can receive therein the pins 2' of the information card to thereby grip the card.

Upon receipt of a signal indicating the completion of gripping of the information card by the grippers, the movement control clutch device 68 pulls out the information card to the projection position by moving the same a distance corresponding to six frames of information, for example. If the pair of sliders 72 are restored to their original positions to return the information card 2 to the container 8 after completion of scanning of the mark, then the solenoid 76 is deenergized, such as by actuation of a limit switch, and the control levers 74 are restored to their original positions in which one end 74a of each control lever 74 is engaged by the engaging portion 70c of one of the grippers 70, so that the grippers 70 are restored to their stand-by positions by permitting the pins 2' of the card 2 to be withdrawn from the openings 70b in the end portions 70a thereof.

Figure 14:
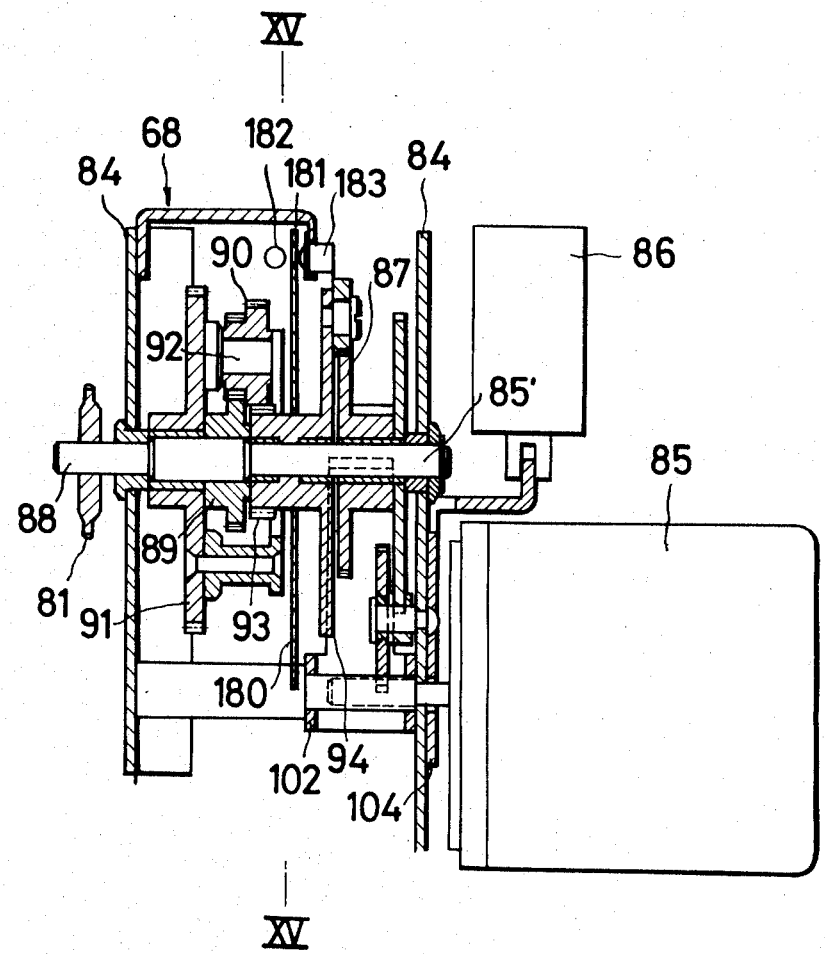
FIG. 14 is a sectional side view of the movement control device for intermittently moving the information card and/or the projection optical apparatus.
Figure 15:
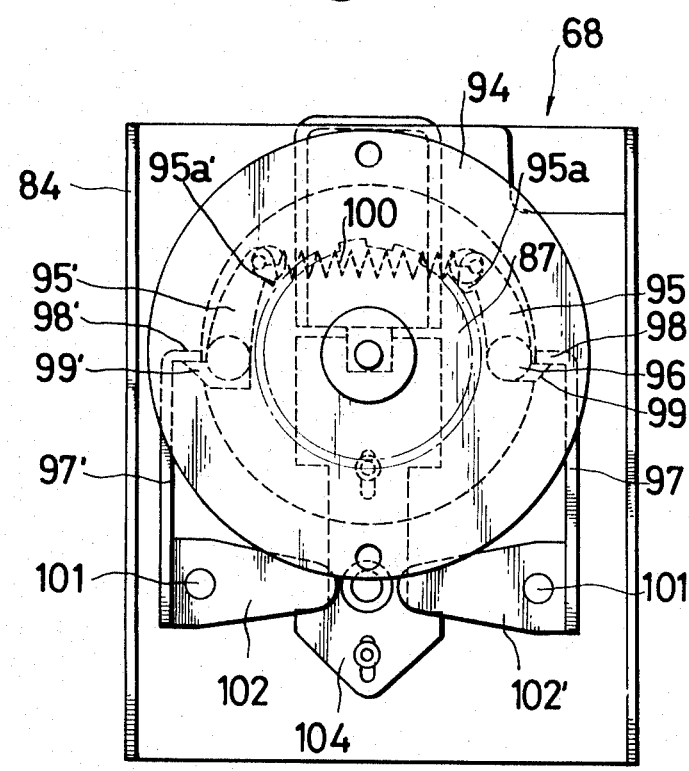
FIG. 15 is a sectional view taken along the line XV—XV of FIG. 14.

The movement control clutch device 68 comprises, as shown in FIG. 14 and FIG. 15, clutch means contained in a casing 84 and a reversible motor 85 and a solenoid 86 secured to the casing.

A toothed wheel 87 is secured to a drive shaft 85' connected to the reversible motor 85 through a gear train. An output shaft 88 is rotatably journalled in a bearing secured to the casing 84 and has secured thereto a sun gear 89 and the transmission wheel 81. Maintained in meshing engagement with the sun gear 89 is a planet gear 90 which is rotatably supported by a pin 92 attached to a planet gear support plate 91 rotatably supported by the output shaft 88. The planet gear 90 is also maintained in meshing engagement with another gear 93 rotatably supported by the drive shaft 85' of the motor and the output shaft 88. The gear 93 has a rotary disk 94 secured thereto.

As seen in FIG. 15, attached to the rotary disk 94 are a pair of arms 95 and 95' pivotally supported by pins 96 to be disposed on opposite sides with respect to the toothed wheel 87. The arms 95 and 95' have at their front end portions pawls 95a and 95a', respectively, which are adapted to engage teeth of the toothed wheel 87, and have at their rear end portions near the center of pivotal movement, stoppers 99 and 99' which are adapted to engage control end portions 98 and 98' of control levers 97 and 97' respectively.

The surface of the control end portions 98 and 98' are shaped such that they are brought into engagement with the stoppers 99 and 99', in the same manner as shown in FIG. 15, as when the rotary disk 94 has made one-half revolution and the arms 95 and 95' have moved to positions in which they are reversed to each other with respect to a line connecting the control end portions 98 and 98' and the center of rotation of the rotary disk 94. To this end, the engaging surfaces of the control end portions 98 and 98' may, for example, be formed as parallel surfaces and a plane disposed midway between the two engaging surfaces of the portion 98' may be made to be disposed on a line passing through the center of rotation of the toothed wheel 87.

A spring 100 is mounted between forward end portions of the arms 95 and 95' so as to urge the two arms toward each other.

The control levers 97 and 97' are pivotally supported by pins 101 and have arms 102 and 102, respectively, which are maintained in engagement with an arm 104 pivotally connected to an arm of the plunger of solenoid 86 and supported for sliding motion by the casing 84. The control levers 97 and 97' are arranged such that they are simultaneously pivoted in opposite directions through the arm 104 as the rod of the solenoid 86 reciprocates and the control end portions 98 and 98' of the control levers 97 and 97' simultaneously move to positions in which they are brought into or out of engagement with the stoppers 99 and 99' respectively.

The aforementioned movement control clutch device 68 is effective to move the card a predetermined number of times either in a normal or reverse direction upon receipt of an instruction signal. That is, when a reverse direction movement signal is received, the direction of rotation of the motor 85 is changed from the normal to the reverse direction, and the number of times the solenoid 86 is energized is determined in accordance with the number of times the card is moved.

In operation, assuming that a signal is supplied for moving the card by one frame in the normal direction, the motor 85 will rotate clockwise in FIG. 15 and the solenoid 86 is energized. Energization of the solenoid 86 moves the arms 102 and 102' upwardly through the action of arm 104 and pivotally releases the control end portions 98 and 98' of the control levers 97 and 97' from engagement with the stoppers 99 and 99' of the arms 95 and 95', respectively. Since the arms 95 and 95' are urged to move toward each other by the biasing force of the spring 100, their pawls 95a and 95a' are brought into pressing engagement with teeth of the toothed wheel 87, and the pawl 95a' of arm 95' grippingly engages the toothed wheel 87 rotating clockwise. Thus, the rotary disk 94 is rotated clockwise.

The solenoid 86 is de-energized shortly after it is energized, so that the stopper 99' of the arm 95' is brought after the rotary disk 94 has made one-half revolution, into engagement with the control end portion 98 of the control lever 97 which has been restored to its original position or engaging position, thereby stopping the rotary disk 94.

The stopper 99 of the arm 95 passes by the control lever 97' by pushing it aside using the back surface thereof which is formed as an inclined surface, and the rotary disk 94 stops at the time the stopper 99 passes by the control lever 97' so that the stopper 99 is brought into engagement with the control end portion 98' of the control lever 97' when it is brought to a halt.

One-half revolution of the rotary disk 94 rotates the output shaft 88 through a predetermined angle through the gear 93, planet gear 90 and sun gear 89. Angular rotation of the output shaft 88 is transmitted through the transmission wheels 81 and 80 and transmission means 82 to the transmission wheel 77 to rotate the same through a predetermined angle. This moves the sliders 72 through the transmission means 79, and hence the information card 2 by one frame. Thus, it is possible, by giving a required signal, to move the information card by a required number of frames in a required direction by energizing the solenoid 86 a number of times corresponding to the number of frames by which the card is to be moved.

If the solenois 86 is permitted to remain energized for a predetermined time interval once it is energized and to be deenergized when the rotary disk 94 has made more than one-half revolution, it is possible to let the rotary disk 94 make one complete revolution when one signal is received. When this is the case, if the motor 85 is set such that it stops rotating after the rotary disk 94 has made one complete revolution following deenergization of the solinoid 86, it will be possible to effect control of movement of the information card as desired by permitting the output shaft 88 to rotate through a predetermined angle each time the rotary disk 94 makes one complete revolution, not one-half revolution.

A timing disk 180 is secured to a boss of the gear 93 in adjacent relation to the rotary disk 94 and has formed therein one or a plurality of openings 181 therein. When it is desired to let the rotary disk 94 make one complete revolution each time solenoid 86 is energized, one opening 181 is provided; when it is desired to let the rotary disk 94 make one-half revoltion, two openings 181 are provided in positions diametrically opposed to each other. If a light emitter or light emitting diode or lamp 182 and a light receiver or phototransistor 183 are arranged on opposite sides of the timing disk 180 in positions in which light emanating from the lamp 182 is incident on the phototransistor 183 when the path of light is aligned with the opening or openings 181, the light will be incident on the phototransistor 183 and produce a signal each time the light path is aligned with the opening. By supplying this signal to a counter, it is possible to count the number of times of energization of the solenoid 86 or the number of frames by which the information card is moved.

The planet gear support table 91 of the movement control device is usually fixed. However, when there is a slight error in the movement of the card, it is possible to effect fine adjustments of the position of the card by turning a knob disposed outside the casing 18' and rotating the planet gear support plate 91 through known rotation transmitting means.

When the information card is set at a predetermined position, the projection lamp device 1 and projection device 3 are moved in a direction normal to the direction of movement of the information card to positions in which they are ready for projection.

Figure 16:
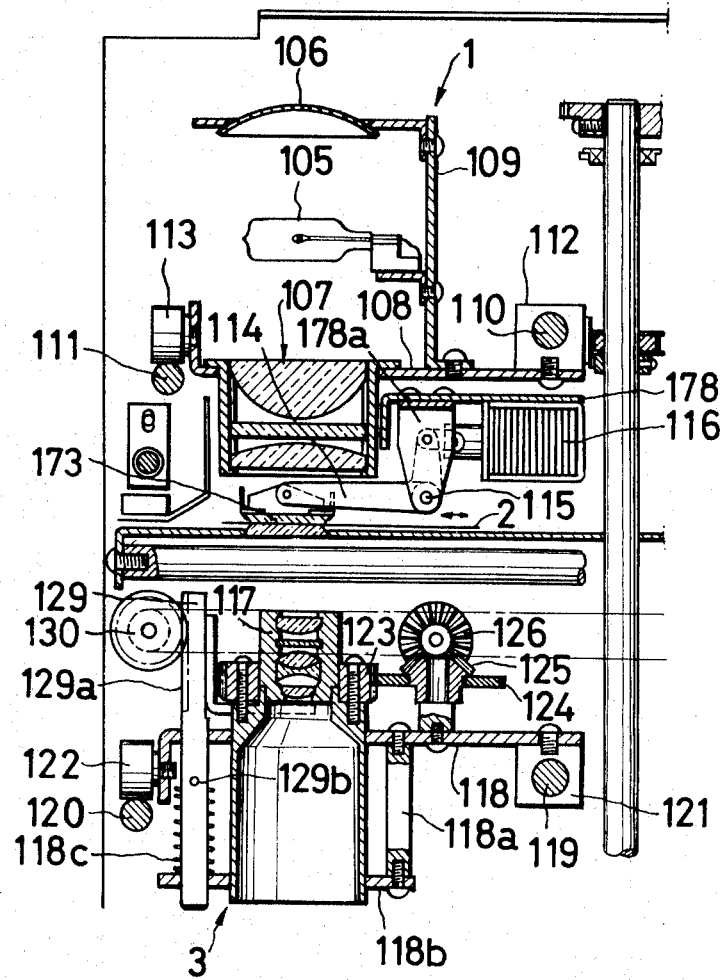
FIG. 16 is a sectional view of the projection optical apparatus according to this invention.
Figure 17:
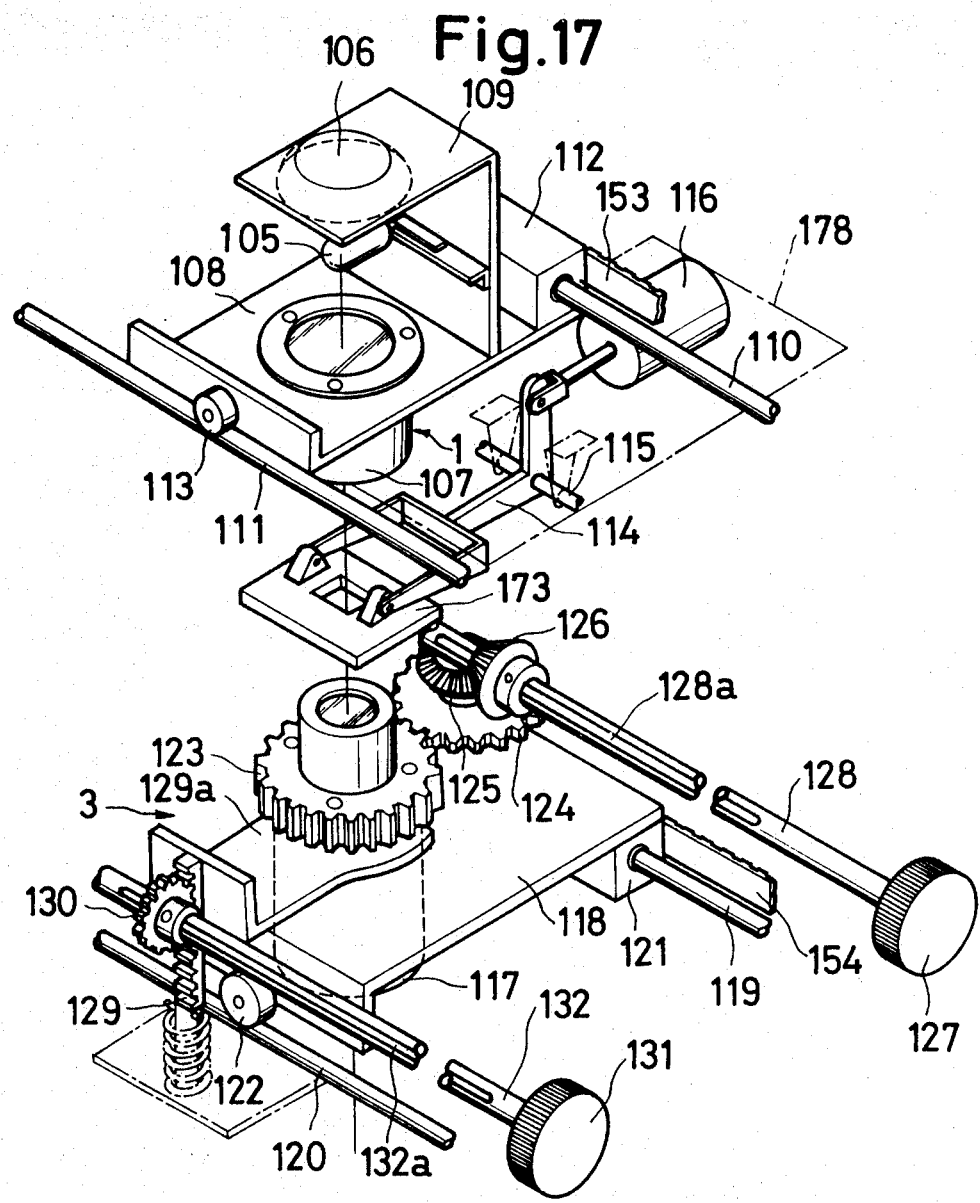
FIG. 17 is a perspective view showing the projection lamp device and the projection device separately.

In FIGS. 16 and 17, the projection lamp device 1 is shown as comprising a lamp 105, a reflector 106 and a lens system 107. the projection lamp device 1 id disposed in a casing made up of a support table 108 and a frame 109 to project a picture of one frame of information of the information card by the light of the lamp 105.

The support table 108 is guided in reciprocating motion in a direction normal to the direction of movement of the information card by a slider 112 and a roller 113 which in turn are guided by guide rods 110 and 111, respectively.

Secured to the frame is a support plate 178 to which is secured a bracket 178a pivotally supporting a lever 114 of bell crank shape through a pin 115. Pivotally connected to the forward end of one arm of the lever 114 is a hold-down plate 173 which is disposed below the lens system 107 to hold down the information card at the time of projection. The lever 114 is pivotally connected at the other arm to a rod of a solenoid 116.

The projection device 3 is arranged such that it is disposed on a side opposite the lens system 107 of the projection lamp device 1 with respect to the information card in a position in which the optical path of the projection device 3 is aligned with the optical path of the lens system 107. The projection device 3 comprises a lens system 117 comprising suitable lenses and a prism, and a platform 118 for supporting the lens system 117 thereon. The platform 118 is supported and guided by a slider 121 and a roller 122 which in turn are guided by guide rods 119 and 120 parallel to guide rods 110 and 111 respectively.

A gear 123 is secured to the lens system 117 to rotate the lens system 117 about its optical axis and adjust the inclination of the picture projected on the screen. The gear 123 meshes with a gear 124 which is rotated through a pair of bevel gears 125 and 126 meshing with each other by a shaft 128 having a knob 127 attached thereto for adjusting the rotation thereof.

Secured to the lens system 117 for focusing thereof is a rack 129 maintained in meshing engagement with a pinion 130 which can be rotated for effecting adjustments through a gearing or other transmission system by turning a knob 131 and rotating a shaft 132 when necessary.

The lens system 117 is rotatably supported by a focusing arm 129a and loosely fitted in a support table 118. The focusing arm 129a is secured at one end thereof to a rack 129 which movably extends through an opening formed in the support table 118 and an opening formed in a plate 118b supported by the support table 118 through a support bar 118a. The weight of the lens system 117 is supported by the plate 118b through a spring 118c supported by the plate 118b and loosely wound about the rack 129 and a pin 129b inserted in the rack 129 and connected to the spring 118c.

When the rack 129 is moved vertically by the rotation of the pinion 130, the lens system 117 supported by the rack 129 through the focusing arm 129a also moves vertically to effect focusing. The lens system 117 is guided by the support table 118 for facilitating vertical movement when focusing is effected.

The gear 123 is formed to have a large width so as to be maintained in meshing engagement with the gear 124 at all times when the lens system 117 moves vertically. The bevel gear 126 and pinion 130 may be supported through known means by the support table 118 for movement therewith as a unit. The bevel gear 126 and pinion 130 are formed such that they positively mesh with the shaft 128 and shaft 132 respectively at all times when the support table 118 changes its position. To this end, slots 128a and 132a may be formed in the shafts 128 and 132, respectively to receive therein pins attached to the bevel gear 126 and pinion 130, respectively, permitting the shaft 128 and bevel gear 126 and the shaft 132 and pinion 130 to move relative to each other axially of the respective shafts while precluding their rotation relative to each other.

Figure 18:
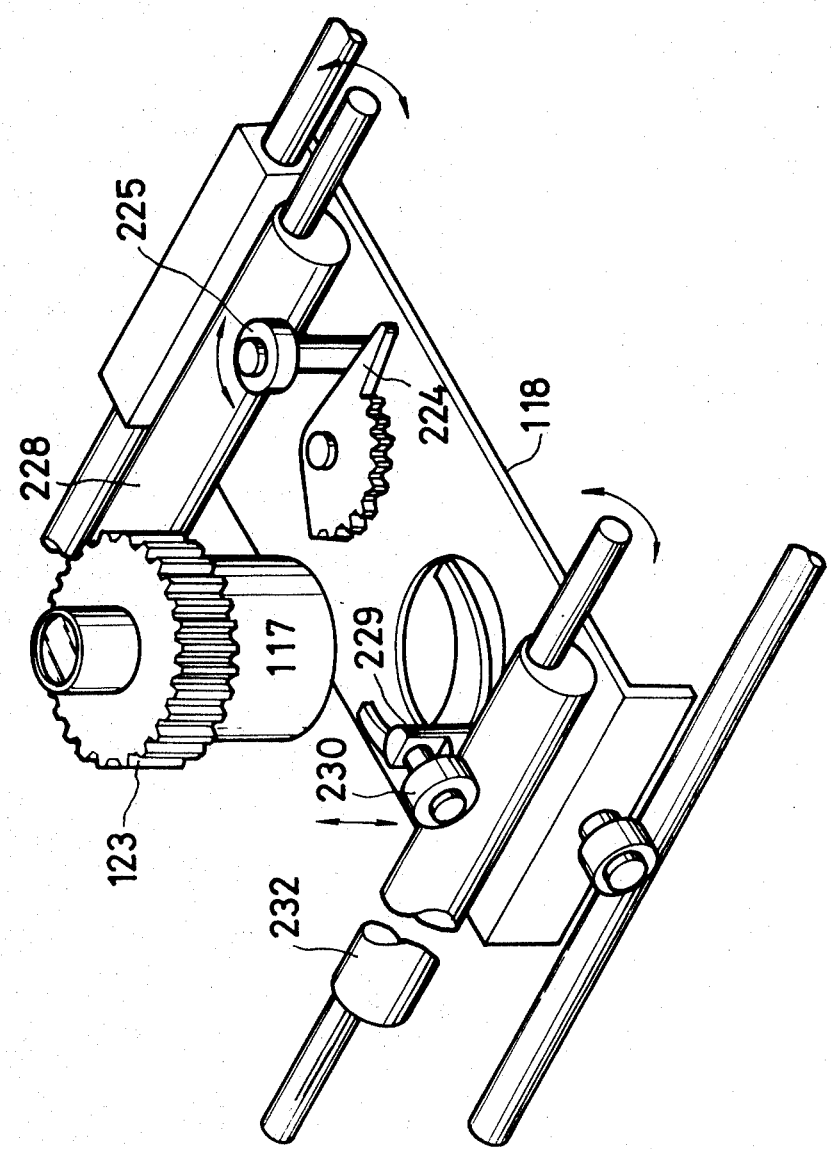
FIG. 18 is a perspective view of another embodiment of the projection device shown in FIG. 17.

In FIG. 18, there is shown a modification of the focusing structure shown in FIG. 16 and FIG. 17 in which an adjusting shaft 232 formed with an elongated eccentric cam portion 232a and rotatably supported by the machine frame is used in place of the shaft 132 and an adjusting shaft 228 formed with an elongated eccentric cam portion 228a and rotatably supported by the machine frame is used in place of the shaft 128.

In the structure shown in FIG. 18, there is provided an adjusting bar 229 supporting at one end thereof a rotary roller 230 serving as a cam follower which performs the same function as the teeth of the rack 130 and which is maintained in engagement with the eccentric cam portion 232a of the adjusting shaft 232, so that the rotary roller 230 can move on the eccentric cam portion of the adjusting shaft 232 even if the support table 118 moves. By this arrangement, the lens system 117 can be moved vertically to effect focusing through the rotary roller 230 and adjusting bar 229 by rotating the adjusting shaft 232 comprising the eccentric cam portion.

In the structure shown in FIG. 18, there is also provided a segmental gear 224, in place of the gear 124 shown in FIG. 16 and FIG. 17, which is maintained in meshing engagement with the gear 123. The segmental gear 224 supports at one portion thereof a rotary roller 225 which servies as a cam follower maintained in engagement with the eccentric cam portion 228a of the adjusting shaft 228, so that the rotary roller 225 moves on the eccentric cam portion of the adjusting shaft 228 when the support table 118 moves. Thus, if the adjusting shaft 228 having the eccentric cam portion is rotated when the support table 118 is in a given position, then the segmental gear 224 is rotated through the rotary roller 225 and causes the gear 123 to rotate, so that the lens system 117 can be rotated to adjust the position of the image.

The support table 108 of the projection lamp device and the support table for the projection device can be formed integrally, and can be moved as a unit by the drive mechanism as subsequently to be described.

Figure 19:
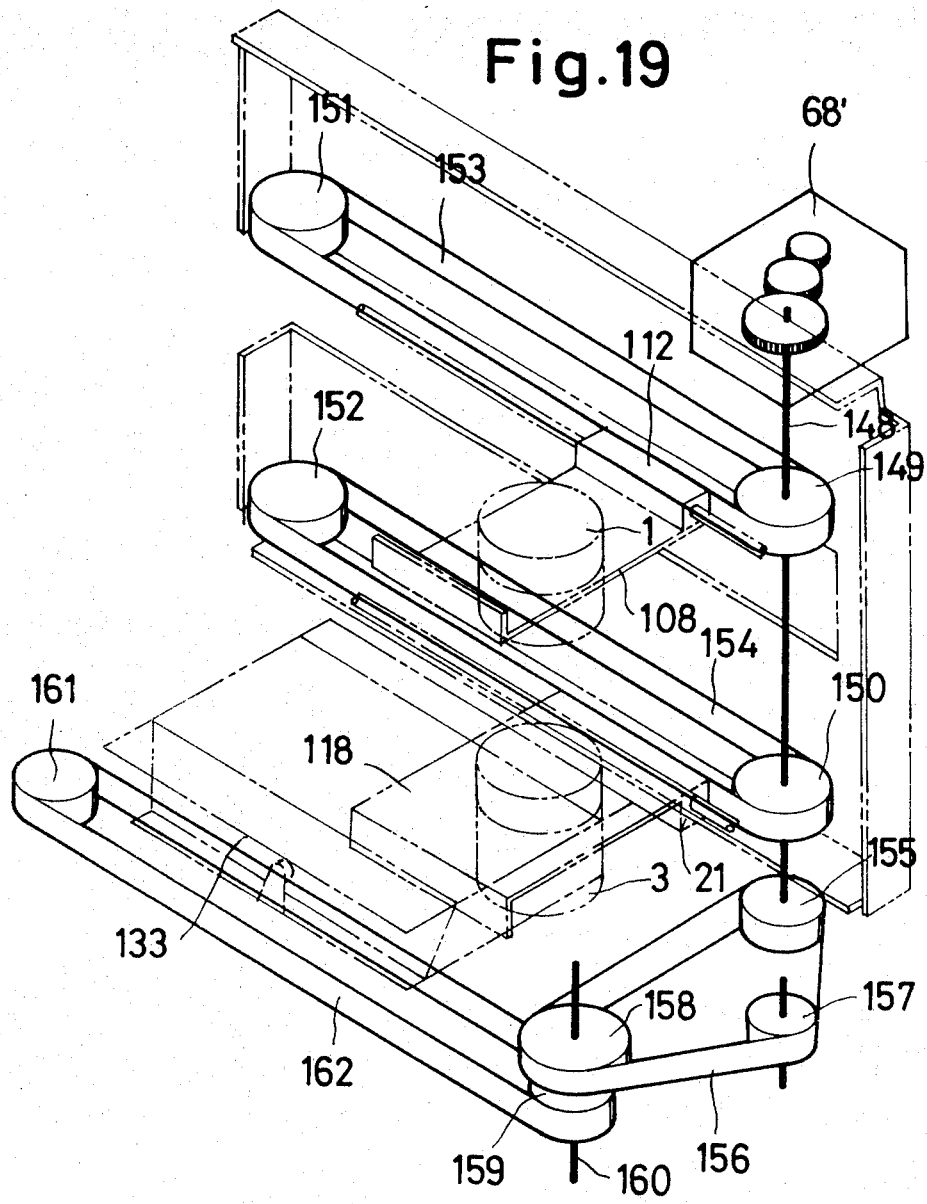
FIG. 19 is a schematic perspective view of another form of the movement control device for the projection lamp device and the projection device.

In FIG. 19, the projection lamp device 1 and projection device 3 are shown to be controlled conjointly by a movement control clutch device 68' which is similar to the movement control clutch device 68 for the card withdrawal device 34 and transmission means and gearing in their movement in a positive or reverse direction by a predetermined number of frames upon receipt of a command signal. The movement of the projection lamp device 1 and projection device 3 is effected in unison with the movement of a mirror device of the mirror unit B.

Figure 20:
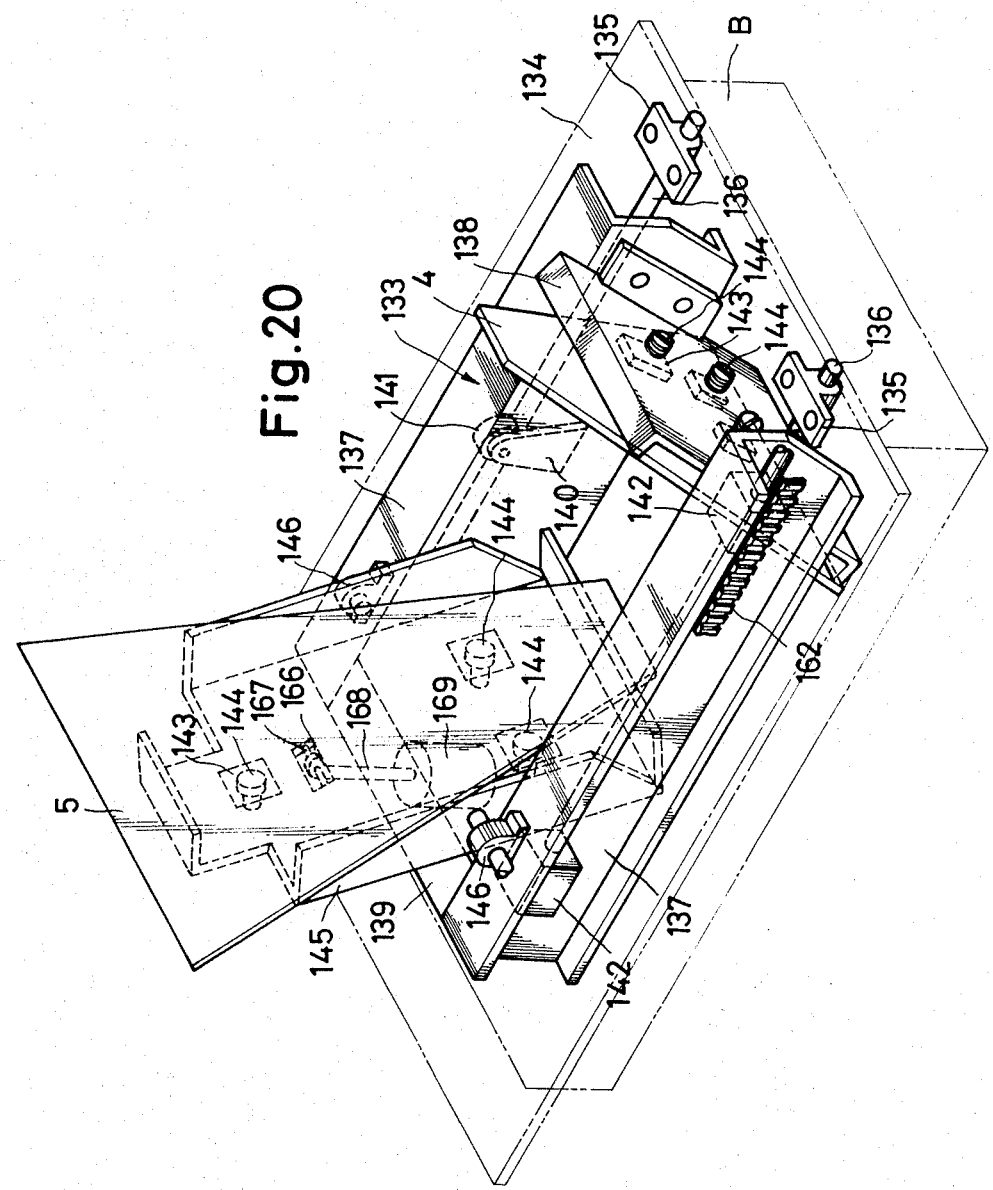
FIG. 20 is a perspective view of the mirror unit.
Figure 21:
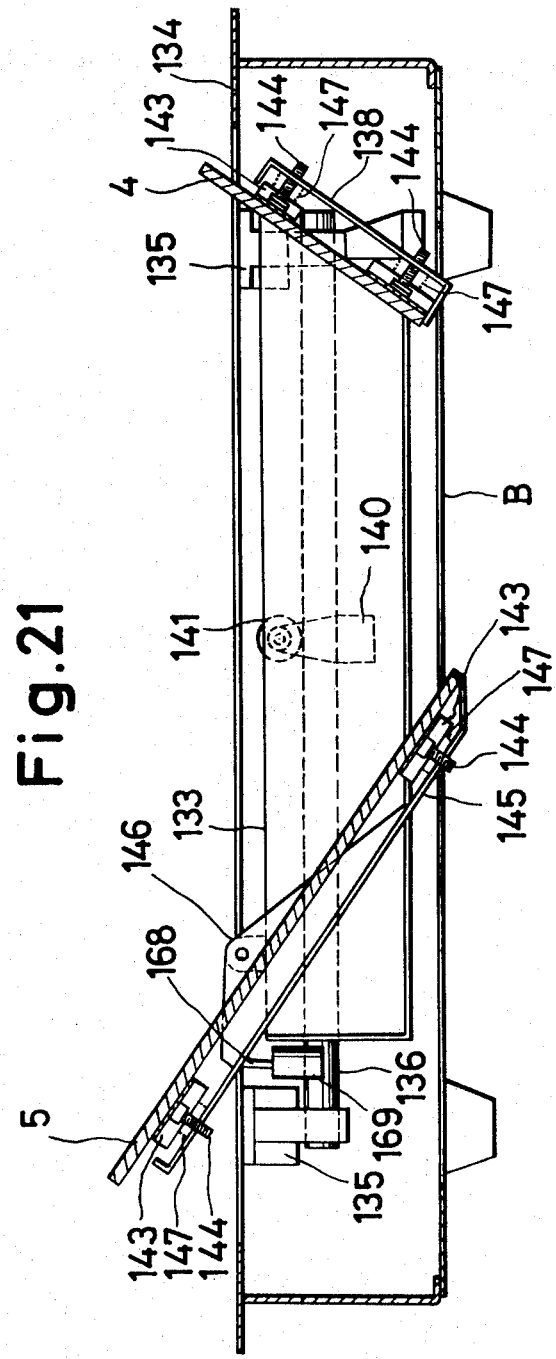
FIG. 21 is a sectional front view of the mirror unit.

Light transmitted through the projection device 3 is thrown on to the first mirror 4 of the mirror unit B shown in FIG. 2, and in greater detail in FIG. 20 and FIG. 21.

As shown in FIG. 20 and FIG. 21, a casing upper plate 134 of the mirror unit B is used as a reference plate for positioning and has brackets 135 mounted thereon and supporting guide rods 136 for supporting various members thereon.

On the casing upper plate 134 is provided a box-shaped frame 133 comprising channel-shaped side frame members 137, a first mirror support frame member 138 secured to the side frame members 137 and disposed in inclined position, and a channel-shaped rear frame member 139 secured to the side frame members 137. The box-shaped frame 133 is guided by guide rods 136 through a roller 141 supported by a bracket 140 mounted on one of the side frame members 137 and a slider 142 mounted on the other side frame member 137.

The first mirror 4 is supported at three points by the mirror support frame member 138 of the box-shaped frame 133. That is, the first mirror 4 is attached to the frame member 138 and supporters 143 are mounted at three points on the rear surface of the first mirror support frame member 138 in positions corresponding to vertexes of a triangle. Adjusting bolts 144 threaded into openings formed on the rear surface of the frame member 138 extend through and are supported by the supporters 143 such that the heads of the bolts 144 are rotatably supported in recesses formed in the supporters 143 and prevented from being dislodged therefrom. By adjusting the adjusting bolts 144, it is possible to adjust the position of the mirror 4.

Disposed near the rear frame member 139 in the box-shaped frame 133 is a second mirror support frame 145 which is pivotally supported by bearings 146 mounted on the upper surfaces of the side frame members 137. The second mirror 5 is attached to the second mirror support frame 145 and adjustably supported by three adjusting bolts 144 in the same manner as described with reference to the first mirror 4. The first mirror 4 and second mirror 5 are tensioned by compression springs 147 mounted between the supporters 143 and the mirror support frames 138 and 145 in positions in which the adjusting bolts 144 extend through the supporters 143 so as to positively effect adjustments of the position of the mirrors.

The projection lamp device 1, projection device 3 and box-shaped frame 133 for the mirrors may be operated in synchronism with one another by the single drive mechanism which is shown schematically in FIG. 19. A transmission wheel 149 for moving the projection lamp device 1, which may be a pulley for a timing belt, and a transmission wheel 150 for moving the projection device 3, which may also be a pulley for a timing belt, are secured to a shaft 148 connected to an output shaft of the movement control clutch device 68', which is similar to the device 68 for the card withdrawal device 34.

Transmission means 153 and 154, which may be a timing belts or the like, are entrained about the transmission wheels 149 and 150 and other transmission wheels 151 and 152, respectively, which are spaced apart from the transmission wheels 149 and 150 in the direction of movement of the projection lamp device 1 and projection device 3. The transmission means 153 and 154 are threadably or adhesively secured at one portion thereof to the slider 112 on the support table 108 for the projection lamp device 1 and the slider 121 on the support table 118 for the projection device 3.

Secured to the shaft 148 is another transmission wheel 155 which is connected to an idler 157 and a transmission wheel 158 through transmission means 156. The transmission wheel 158 is secured to a shaft 160 for rotation with another transmission wheel 159 as a unit. Transmission means 162, which may be a timing belt, is entrained about the transmission wheel 159 and a transmission wheel 161 which is spaced apart from the transmission wheel 159 in the direction of movement of the box-shaped frame 133; the transmission means 162 being threadably or adhesively secured at one portion thereof to the box-shaped frame 133.

The number of teeth in each or the diameter of each transmission wheel is set such that the transmission means 153 and 154 travel the same distance in the same time interval while the transmission means 162 travels one-half the distance of movement of the transmission means 153 and 154.

Assuming that the movement control device receives a command signal to have the projection lamp device 1 and projection device 3 a distance corresponding to two frames in the positive direction and the devices 1 and 3 move to the right in FIG. 19 as instructed, the box-shaped frame 133 will move to the right a distance corresponding to 2/2 frames. That is, the first mirror 4 and the second mirror 5 move to the right a distance corresponding to one frame. Since the movement of the projection lamp device 1 and the projection device 3 and the movement of the box-shaped frame 133 are at a ratio 2:1 as aforementioned, the length of the optical path of light from the projection device 3 to the third mirror 6 or the image surface of the printer can be kept constant at all times.

Figure 22:
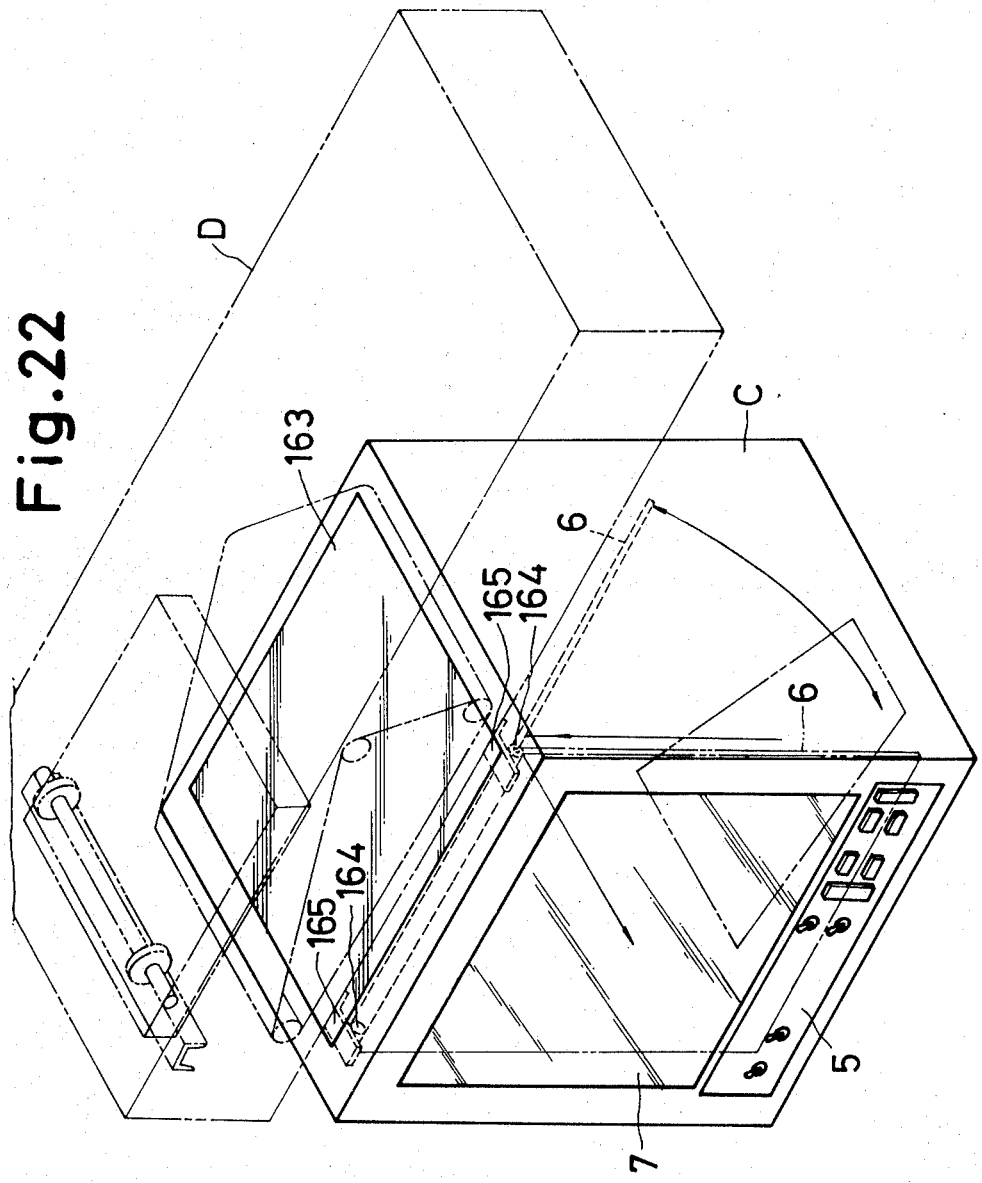
FIG. 22 is a schematic perspective view of the screen unit and the printer unit.

Light reflected by the second mirror 5 moves perpendicularly upwardly, is reflected by the third mirror 6 of the screen unit, and projected on to the screen 7 as shown in FIG. 3. The screen 7 is disposed in the front of a casing 163 of the screen unit C and the third mirror 6 is pivotally supported by the upper front edge of the casing 163 through pins 164 as shown in FIG. 22. Brackets 165 from which the third mirror 6 ishung can be pivoted about the pins 164 by suitable known means, such as a motor and timing belt arrangement.

When an image of a frame of the information card 2 is to be formed on the screen 7, the third mirror 6 is maintained in an inclined position as shown in broken lines in FIG. 22. When the image is to be printed, the motor is actuated, upon receipt of a signal to pivot and maintain the third mirror 6 in an upright position shown in dash-and-dot lines. When this is the case, the mirror 6 serves as a light intercepter for any light entering through the screen 7. With the third mirror 6 in its upright position, light reflected by the second mirror 5 moves perpendicularly upwardly and is projected through surface 163a onto an exposure surface of the printer unit D.

When attempts are made to obtain a compact size it is possible that the second and third mirrors 5 and 6 may be positioned relative to each other such that when the third mirror 6 is pivoted it strikes the second mirror 5. When this is the case, it is necessary to pivot the second mirror 5 before the third mirror 6 is pivoted to prevent the collision. To this end, the second mirror 5 is arranged such that it can be pivoted through a predetermined angle about support shafts supported by the brackets 146 on the box-shaped frame 133 of the mirror unit C. As seen in FIGS. 20 and 21a slot 166 may be formed in the upper middle portion of the second mirror support frame 145 and a pin 167 may be connected to the edges of the slot to extend along the major axis thereof for pivotally supporting a lever 168 which can be moved vertically by means of a solenoid 169 mounted on the box-shaped frame 133.

The printer unit D which may be of conventional type is detachably mounted on the projection unit A and the screen unit B. The exposure surface of the printer unit D is set at a position such that light reflected by the second mirror 5 and passing through the screen unit surface 163a is projected on to the exposure surface.

A control keyboard for all the mechanisms of a micro-reader-printer according to this invention which is schematically shown in FIG. 1 is designed such that it can be mounted in any position in any manner as desired depending on the use to which the mahcine is to be put.

A summary of the operation of all the mechanisms of the microreader-printer according to this invention will now be described.

1. First, a predetermined container storing therein a number of information cards is placed on the container support panel 12 in the container chamber 11. The lowermost information card 2 in the container 8 is indexed with the sensor 35 in its read-out position.

2. Then, a search button on the keyboard is depressed. This actuates the motor 55 of the scanning device 33 and energizes the solenoid 66, and the sensor 35 scans the marked edge of the lowermost information card 2 till it stops after reading the last bit of the marks. The mark read out by the sensor is compared with the mark of the information card of interest to be found by the instruction by a logic circuit.

When the marks do not agree with each other, a NO signal is produced to actuate the motor 23 of the information card container movement control clutch device 21 and energize the solenoid 31, so that the container 8 moves downwardly a distance corresponding to the spacing between the two cards and the next following information card is indexed with the sensor in the read-out position. When the next following information card is indexed with the sensor 35, the solenoid 66 of the scanning device 33 is energized to move the sensor 35 in scanning motion along the marked edge of the card to thereby read the coded marks. When the logic circuit produces a NO signal with respect to this card, the aforementioned operation is repeated to bring the next following information card into index with the sensor 35 in the read-out position.

When the mark of the information card agrees with the mark of the desired information card being sought, the logic circuit produces a YES signal. This deactuates the motor 55 of the scanning device 33 and at the same time actuates the solenoid 31 and motor 23 of the information card container control clutch device 21. The motor 23 has already been actuated when the information card first scanned and de-actuated when the next card was indexed with the sensor 35. Actuation of solenoid 31 then moves the container 8 a predetermined distance or a distance covered by the downward movement of two cards, for example, to a card withdrawal position. With the card in the card withdrawal position, the solenoid 76 of the card withdrawal device 34 is energized and causes the pair of grippers 70 to grip the pins of the card 2; the motor 23 of the card container movement control clutch device 21 being de-actuated upon gripping of the card by the grippers.

A signal is produced when the information card 2 is gripped by the pair of grippers 70 and actuates the motor 85 and solenoid 86 of the movement control device 68 of the card withdrawal device 34, so that the card is moved to the projection position a distance corresponding to the predetermined number of frames, such as six frames, for example. After the card is moved a distance corresponding to six frames with the solenoid 86 being energized six times, the motor 85 is rendered inoperative. Thus, the preparation for projecting the desired information card is completed.

3. Upon completion of preparation for projecting the desired information card, a button on the keyboard is depressed to produce a signal indicating the position of the frame which contains the desired information. This renders operative the motor 85 and solenoid 86 of the movement control device 68 for the card withdrawal device 34 and the motor and solenoid of the movement control clutch device 68' for the projection device 3. Let us assume that the signal produced indicates that the rightmost frame on the third row from the grip of the card be read, for example, and that the projection lamp device 1 and projection device 3 remain stationary above the third frame from the right of a row containing six frames. Then the solenoid 86 of the movement control clutch device 68 for the card withdrawal device 34 is energized twice to move the card a distance corresponding to two frames, and at the same time the solenoid of the movement control clutch device 68' for the projection lamp device 1 and projection device 3 is also energized twice to move the projection lamp device 1 and projection device 3 rightwardly a distance corresponding to two frames. Thus, the projection device is set at the desired frame.

When the desired frame of the desired information card is set at the projection position by the card withdrawal device 34, the solenoid 116 is energized to move the hold-down plate 173 into place to fix the information card 2. Simultaneously as the projection lamp device 1 and projection device 3 move, the box-shaped frame 133 or the first mirror 4 and second mirror 5 of the mirror unit B moves a distance which is one-half the distance covered by the movement of the projection device.

In case the mechanism for automatically setting the projection device at the position of the desired frame of an information card is eliminated to reduce production cost or even when this mechanism is incorporated in the micro-reader-printer, the projection device can be set manually at the position of the desired frame according to this invention. To this end, buttons (Y+) and (Y−) and (X+) and (X−) are provided as movement control buttons for the card withdrawal device 34 and projection device 3 respectively. By depressing one of these buttons, the card can be moved vertically or horizontally a distance corresponding to one frame of the card to set the card and the projection device at the desired position. When the movement control is effected automatically, a number of pushbuttons $X_1$, $X_2$ .... $X_6$ and $Y_1$, $Y_2$.... $Y_7$, for example, and a control device are provided.

When the desired frame of the desired information card is set at the projection position, an image of the information contained in the frame can be projected instantly on to the screen because the lamp of the projection lamp device 1 is turned on as soon as it is connected to the main power source or the search button is depressed.

4. When it is desired to print the information, a print button is depressed. This energizes the solenoid 169 of the mirror unit B and brings the second mirror 5 to a lying position. When the second mirror is brought to the lying position, the drive for the third mirror 6 is actuated as by a signal from a limit switch or the like to pivot the third mirror 6 to an upright position in which it is parallel to the screen 7 to shield it.

A limit switch or the like is turned on to produce a signal when the third mirror 6 is brought to the upright position to energize the solenoid 169 for the second mirror 5 to restore it to its original position, thereby completing preparation for printing the desired information. Completion of the preparation for printing may be indicated as by turning on a lamp, or a control circuit may be provided so that the printer unit is not connected to the power source and does not operate until preparation for printing is completed.

If a photosensitive sheet is placed at the projection position after preparation for printing is completed and the printer actuation button is deperssed, then it is possible to produce a duplicate of the desired information.

In order to switch the micro-reader-printer from printing to projection on the screen, a control circuit may be provided for pivoting the second mirror by depressing the button before the third mirror is restored to its original or projection position.

5. When printing or projection of information is finished or when the desired card is not found, a reset button is depressed.

Depression of the reset button actuates the motor 85 and solenoid 86 of the movement control clutch device 68 for the card withdrawal device 34 so that the card 2 is returned to the container 8. The solenoid 86 is energized a required number of times till the card is returned to the original position in the container 8. Upon restoration of the card to its original position in the container, the motor 85 is de-actuated while the motor 23 of the container control clutch device 21 is rotated in a direction opposite to the direction in which it was rotated when the container was originally moved and the solenoid 31' is energized, so that the container 8 and container support panel 12 are returned to the stand-by position or the uppermost position.

The restoration of the container 8 and the container support panel 12 to the stand-by position may be detected as by a limit switch and a signal may be produced to render the motor of the container movement control device inoperative.

The operation is thus completed.

When it is desired successively to project on the screen or print a plurality of frames of information of one information card, an instruction can be given by depressing a button to set the next following frame of the information card at the projection position in the same manner as described above after projection of the preceding frame is completed.

According to the invention, a single predetermined information card may be directly placed on the information card support panel for read-out without searching for the desired information card from the container. To this end, the single card is inserted in the single card rest provided in the lowermost portion of the panel 12 and a manual card withdrawal button is depressed. This energizes the solenoid 76 in the same manner as selection of the card is automatically performed, so that the card is gripped by the grippers 70 and moved to the projection in the same manner as described above.

When the card is set at the projection position, an instruction can be given to set the desired frame at the projection position and effect projection of the information on the screen, or printing thereof in the same manner as aforementioned. Then, by depressing the reset button, the card can be returned to the card support panel 12. If the card is withdrawn manually from the card support panel, then the operation is finished.

While the invention has been shown and described with reference to some embodiments thereof, it is to be understood that the invention is not limited to the specific form of each mechanism of the embodiments and that many changes and modifications may be made therein without departing from the spirit and scope of the invention.

Figure 23:
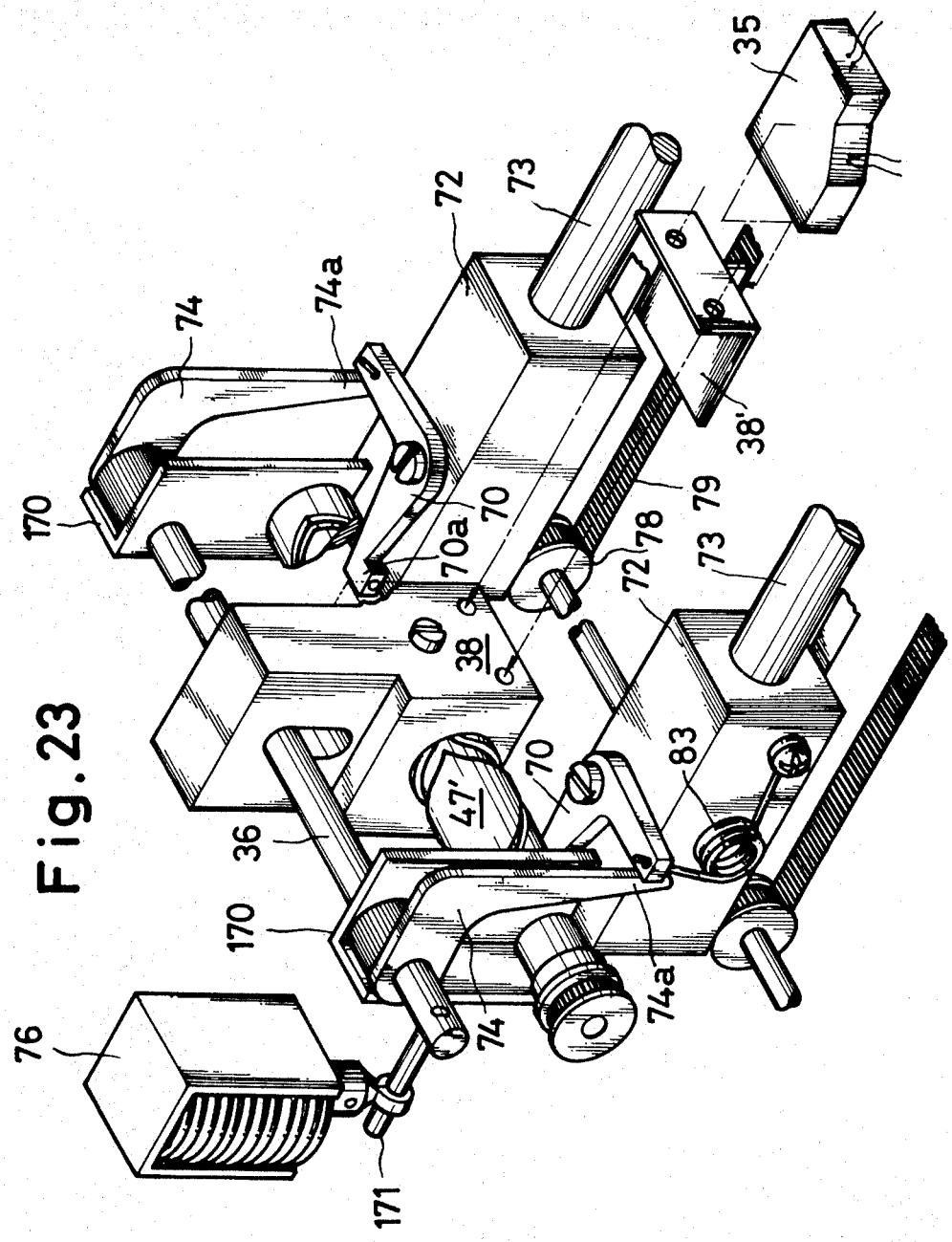
FIG. 23 is a perspective view of a modified form of the sensing device shown in FIG. 12 in which a cam of a different shape is used.

The heart-shaped cam 47 of the movement control clutch device shown in FIG. 12 may be replaced by another cam or a cylindrical groove cam 47' as shown in FIG. 23. The use of the cylindrical groove cam 47' enables a slider 38 carrying the sensor 35 to be used as a cam follower by forming on its inner surface a projection adapted to engage the cam groove. By causing the cylindrical groove cam 47' to serve concurrently as the guide rod 37 shown in FIG. 12, and rotating the cylindrical groove cam 47' from the gears shown in FIG. 12 through known transmission means, it is possible to scan the mark on the information card 2 bit by bit in the same manner as the heart-shaped cam 47 shown in FIG. 12 is used. The use of the cylindrical groove cam in place of the heart-shaped cam offers the advantage of requiring less space for mounting the device in the microreader.

The scanning device shown in FIG. 12 and the card withdrawal device shown in FIG. 13 can be made into a simple construction if, as seen in FIG. 23: the guide rod 36 is made to serve concurrently as the pins 75 shown in FIG. 13.; the control levers 74 are secured to the guide rod 36; the guide rod 36 is rotatably secured to brackets 170 secured to the frame; and a pin 171 connected to a plunger of the solenoid 76 is connected to one end or both ends of the guide rod 36.

It is to be understood that a plurality of sensors corresponding in number to the bits of the marks formed on one edge of the information card 2 may be used and arranged in the read-out position to effect read-out of all the bits simultaneously upon receipt of a command to read out the marks, in place of using the devices shown in FIG. 12 and FIG. 23.

What is claimed is:

1. A microreader for presenting enlarged images of selected areas on miniaturized information-containing media such as information cards, or microfiche, comprising the combination of:
    a. A projection unit including:
       i. optical means for projecting an enlarged image of an area of interest on an information card;
       ii. means for presenting an information card to said optical means at a projecting position; and
       iii. means for relatively positioning said optical means and said information card to select the area on said card whose image is to be projected;
    b. A screen unit for displaying an image projected by said optical means; and
    c. A reflector unit disposed adjacent said projection unit and said screen unit for transferring said projected image between them and including:
       i. movable first reflector means for redirecting said projected image from said projection unit to said screen unit; and
       ii. means for positioning said first reflector means in accordance with the positioning of said optical means when selecting the area on said information card to be projected.

2. A microreader as in claim 1 wherein said screen unit further comprises:
    i. a first surface for displaying said projected image for viewing;
    ii. a second surface for passing said projected image for copying; and iii. pivotable second reflector means for transferring said projected image between said first and said second surfaces.

3. A microreader as in claim 2 further comprising a printer unit disposed adjacent said second surface for copying said projected image when passed thereby.

4. A microreader as in claim 2 wherein said second reflector means is pivotable between a position wherein it reflects said image onto said first surface and a position wherein it permits said image to pass to said second surface.

5. A microreader as in claim 4 further comprising means for pivoting said first reflector means in association with said second reflector means.

6. A microreader as in claim 1 wherein said presenting means comprises:
   i. an elevatable support means for carrying a stack of information cards;
   ii. means for elevating said support means adjacent said projecting position to sequentially position each of said information cards thereat;
   iii. means for scanning an information card at said projecting position and producing a selecting signal; and
   iv. means for removing an information card from said support means for presentation to said optical means in response to said selecting signal.

7. A microreader as in claim 6 wherein said removing means comprises reciprocating gripper means and control clutch means for moving said gripper means between said support means and said optical means.

8. A microreader as in claim 7 wherein said means for relatively positioning said optical means and an information card comprises means for moving said optical means across the path of said gripper means to select the area on an information card to be projected.

9. A microreader as in claim 6 wherein said means for elevating said support means comprises:
   i. a motor having a rotatable output shaft;
   ii. a toothed wheel mounted on said shaft;
   iii. a rotatable disk positioned adjacent said toothed wheel;
   iv. a pawl pivotally mounted on said disk; and
   v. means for pivoting said pawl into engagement with said toothed wheel to rotate said disk with said wheel.

10. A microreader as in claim 6 further comprising coded indicia means on said information cards and wherein said means for scanning said information cards comprises means for providing a signal in response to the sensing of said coded indicis means and means for moving said sensor means to scan said coded indicia means.

11. A microreader as in claim 10 wherein said means for moving said sensor means comprises:
    i. means for supporting said sensor means for reciprocating motion;
    ii. transmission means for driving said sensor means in reciprocating motion;
    iii. cam means for controlling said transmission means; and
    iv. control clutch means for rotating said cam means.

12. A microreader as in claim 6 further comprising container means open on at least one side for holding a stack of said information cards and wherein said support means comprises:
    i. a support panel;
    ii. U-shaped flange means disposed around the edges of said panel for accomodating an information card in the recess formed thereby and for supporting said container with its open side adjacent the open side of said recess, the height of said flange means being such that when an information card in said recess is in position to be removed from said support means, the lowermost information card in said container will be in position for scanning by said scanning means.

* * * * *